US012639375B2

(12) United States Patent
Kattepur et al.

(10) Patent No.: US 12,639,375 B2
(45) Date of Patent: May 26, 2026

(54) RESPONDING TO QUERIES RELATED TO A SENSE IN A COMMUNICATION NETWORK

(71) Applicant: Telefonaktiebolaget LM Ericsson (publ), Stockholm (SE)

(72) Inventors: Ajay Kattepur, Bangalore (IN); Amin Azari, Järfälla (SE); Anil Ramachandran Nair, Bangalore (IN); Prayag Gowgi Somanahalli Krishna Murthy, Mandya (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/682,190

(22) PCT Filed: Aug. 10, 2021

(86) PCT No.: PCT/SE2021/050781
§ 371 (c)(1),
(2) Date: Feb. 8, 2024

(87) PCT Pub. No.: WO2023/018361
PCT Pub. Date: Feb. 16, 2023

(65) Prior Publication Data
US 2024/0346088 A1     Oct. 17, 2024

(51) Int. Cl.
*G06F 16/906* (2019.01)
*G06F 16/9535* (2019.01)

(52) U.S. Cl.
CPC ........ *G06F 16/906* (2019.01); *G06F 16/9535* (2019.01)

(58) Field of Classification Search
CPC .. G06F 16/906; G06F 16/9535; G06F 16/248; G06F 16/285; G16Y 20/40; H04W 4/38
(Continued)

(56) References Cited

U.S. PATENT DOCUMENTS 7,827,189 B2 * 11/2010 Hayama ................. G06F 16/93
99/324
10,610,111 B1 * 4/2020 Tran ...................... A61B 8/565
(Continued)

OTHER PUBLICATIONS

Zhihan Lv, Liang Qiao, Sahil Verma, and Kavita. AI-enabled IoT-Edge Data Analytics for Connected Living. ACM Trans. Internet Technol. 21, 4, Article 104, 20 pages. <https://doi.org/10.1145/3421510>, Nov. 2021.*
(Continued)

*Primary Examiner* — Hung T Vy
(74) *Attorney, Agent, or Firm* — Sage Patent Group

(57) ABSTRACT

A method performed by a network node in a communication network for responding to a query of a first communication device to a second communication device related to a feature of a sense is provided. The method includes receiving a plurality of signatures generated from data including measurements of senses from at least one sensor. Each signature includes a plurality of features of the senses extracted from the measurements and mapped to each signature. The method further includes clustering a signature into a cluster having a classification. The method further includes searching a database that includes a mapping of features to defined labels of senses for the clusters to extract a response to the query. The method further includes signalling the response to the query of the first communication device.

15 Claims, 18 Drawing Sheets

(58) Field of Classification Search
USPC .......................................................... 707/738
See application file for complete search history.

(56) References Cited

U.S. PATENT DOCUMENTS

| | | | | |
|---|---|---|---|---|
| 10,614,138 | B2 * | 4/2020 | Kamen | G06F 16/3329 |
| 10,796,444 | B1 * | 10/2020 | Raichelgauz | G06T 7/70 |
| 10,810,508 | B1 * | 10/2020 | Maximo | G06F 16/906 |
| 11,657,079 | B2 * | 5/2023 | Raichelgauz | G06F 16/438 |
| | | | | 706/46 |
| 2007/0083513 | A1 * | 4/2007 | Cohen | G06F 11/008 |
| 2008/0040344 | A1 | 2/2008 | Hayama | |
| 2013/0346412 | A1 * | 12/2013 | Raichelgauz | G06F 16/35 |
| | | | | 707/737 |
| 2015/0220199 | A1 * | 8/2015 | Wang | G06F 3/016 |
| | | | | 345/173 |
| 2017/0061011 | A1 * | 3/2017 | Huang | H04W 4/38 |
| 2017/0139940 | A1 | 5/2017 | Raichelgauz et al. | |
| 2018/0203917 | A1 | 7/2018 | Marshall et al. | |
| 2018/0322394 | A1 | 11/2018 | Nguyen et al. | |
| 2019/0325060 | A1 | 10/2019 | Fenoglio et al. | |
| 2020/0184278 | A1 * | 6/2020 | Zadeh | G06N 3/044 |
| 2020/0311960 | A1 | 10/2020 | Raichelgauz et al. | |
| 2021/0134469 | A1 * | 5/2021 | Park | A61B 5/1118 |

OTHER PUBLICATIONS

Ira Cohen et. al., Capturing, indexing, clustering, and retrieving system history. In Proceedings of the twentieth ACM symposium on Operating systems principles. Association for Computing Machinery, 105-118. <https://doi.org/10.1145/1095810.1095821>, Dec. 2005.*
International Search Report and Written Opinion of the International Searching Authority, PCT/SE2021/050781, mailed Apr. 27, 2022, 16 pages.
IBM Research-Zurich, "Hypertaste: An AI-assisted e-tongue for fast and portable fingerprinting of complex liquids," By Patrick Ruch, Jul. 5, 2019, Downloaded from the Internet on Sep. 9, 2021 at: https://www.ibm.com/blogs/research/2019/07/hypertaste-ai-assisted-etongue/, 9 pages.
Elprocus, "How Does an Electronic Nose Work?", Downloaded from the Internet on Sep. 9, 2021 at: https://www.elprocus.com/electronic-nose-work/, 19 pages.
Shazam, Downloaded from the Internet on Jan. 27, 2024 at: https://www.shazam.com, 6 pages.
Mendeley Data, "Dataset: Electronic Nose for Quality Control of Colombian Coffee through the Detection of Defects in 'Cup Tests'," Version 1, Published Mar. 11, 2020, Downloaded from the Internet at: https://data.mendeley.com/datasets/7spd6fpvyk/1, 3 pages.

* cited by examiner

Figure 1

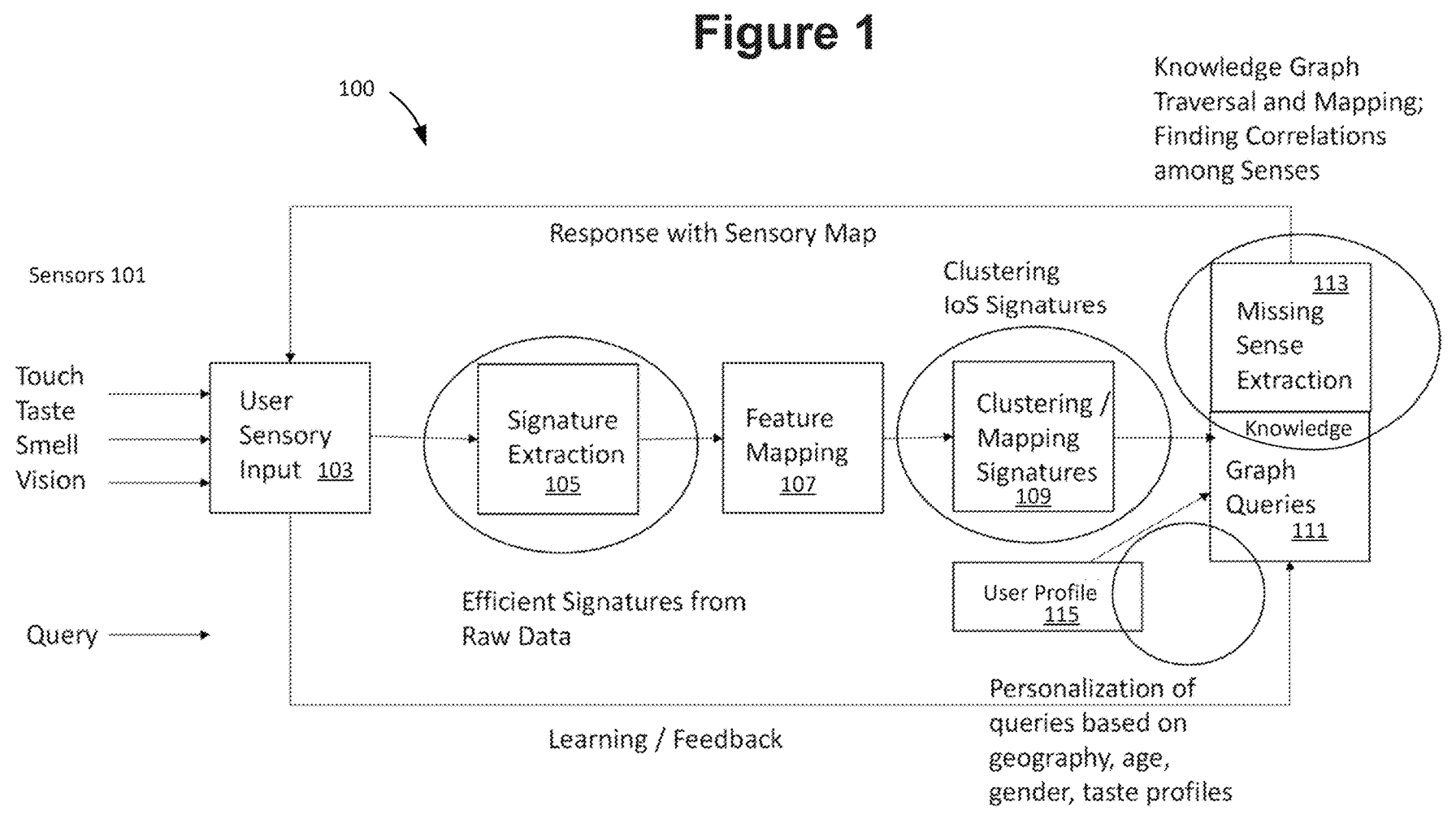

Sensors 101

Touch
Taste
Smell
Vision

Query

User Sensory Input 103

Signature Extraction 105

Feature Mapping 107

Clustering / Mapping Signatures 109

Graph Queries 111

Missing Sense Extraction 113

Knowledge

User Profile 115

100

Response with Sensory Map

Efficient Signatures from Raw Data

Clustering IoS Signatures

Knowledge Graph Traversal and Mapping; Finding Correlations among Senses

Personalization of queries based on geography, age, gender, taste profiles

Learning / Feedback

Percentage of explained variances

Principal Components

Figure 5

Wishart Single Malt Map (2009, 2012)

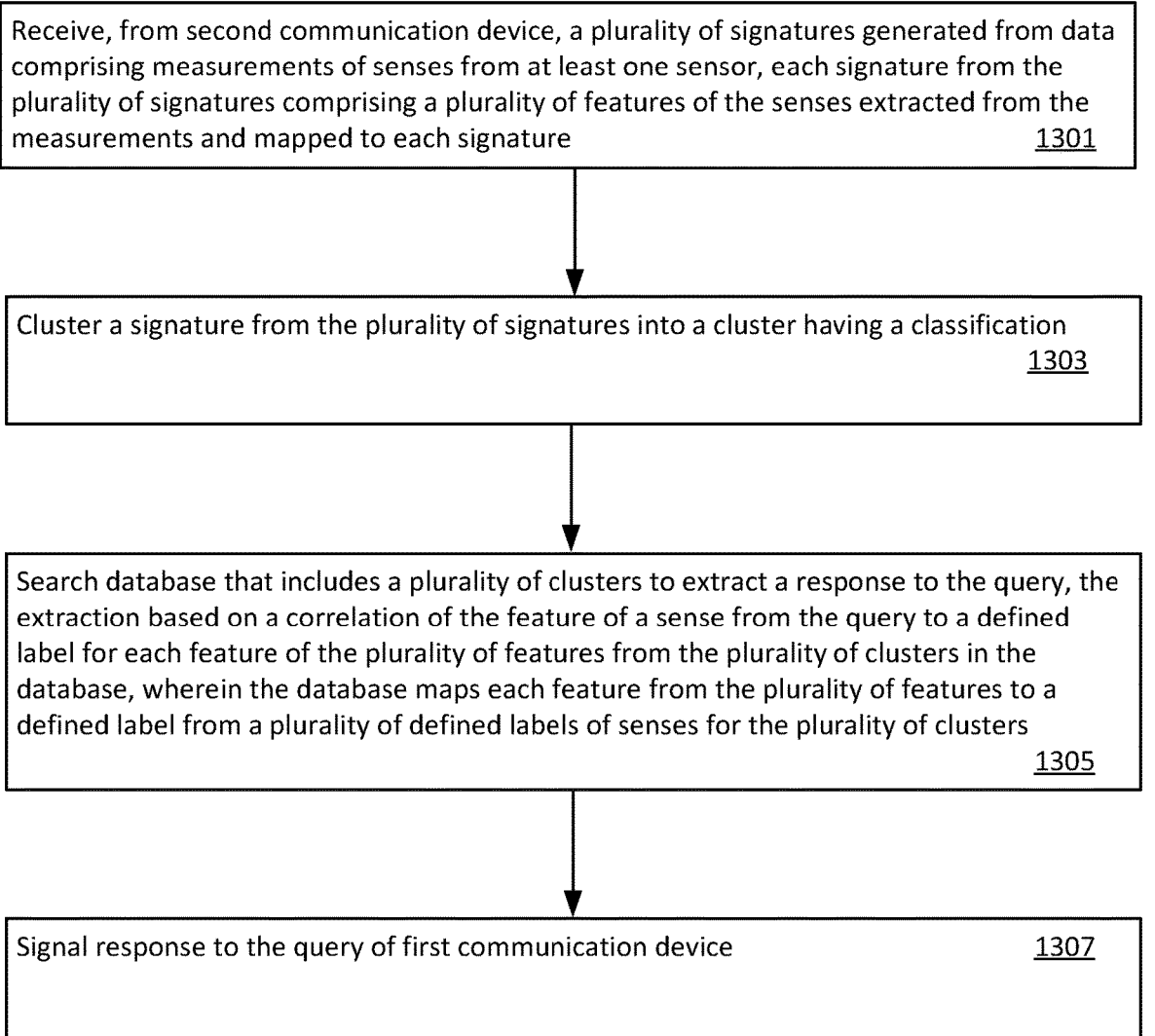

Receive, from second communication device, a plurality of signatures generated from data comprising measurements of senses from at least one sensor, each signature from the plurality of signatures comprising a plurality of features of the senses extracted from the measurements and mapped to each signature                                                                                1301

Cluster a signature from the plurality of signatures into a cluster having a classification
1303

Search database that includes a plurality of clusters to extract a response to the query, the extraction based on a correlation of the feature of a sense from the query to a defined label for each feature of the plurality of features from the plurality of clusters in the database, wherein the database maps each feature from the plurality of features to a defined label from a plurality of defined labels of senses for the plurality of clusters
1305

Signal response to the query of first communication device                                    1307

Figure 13

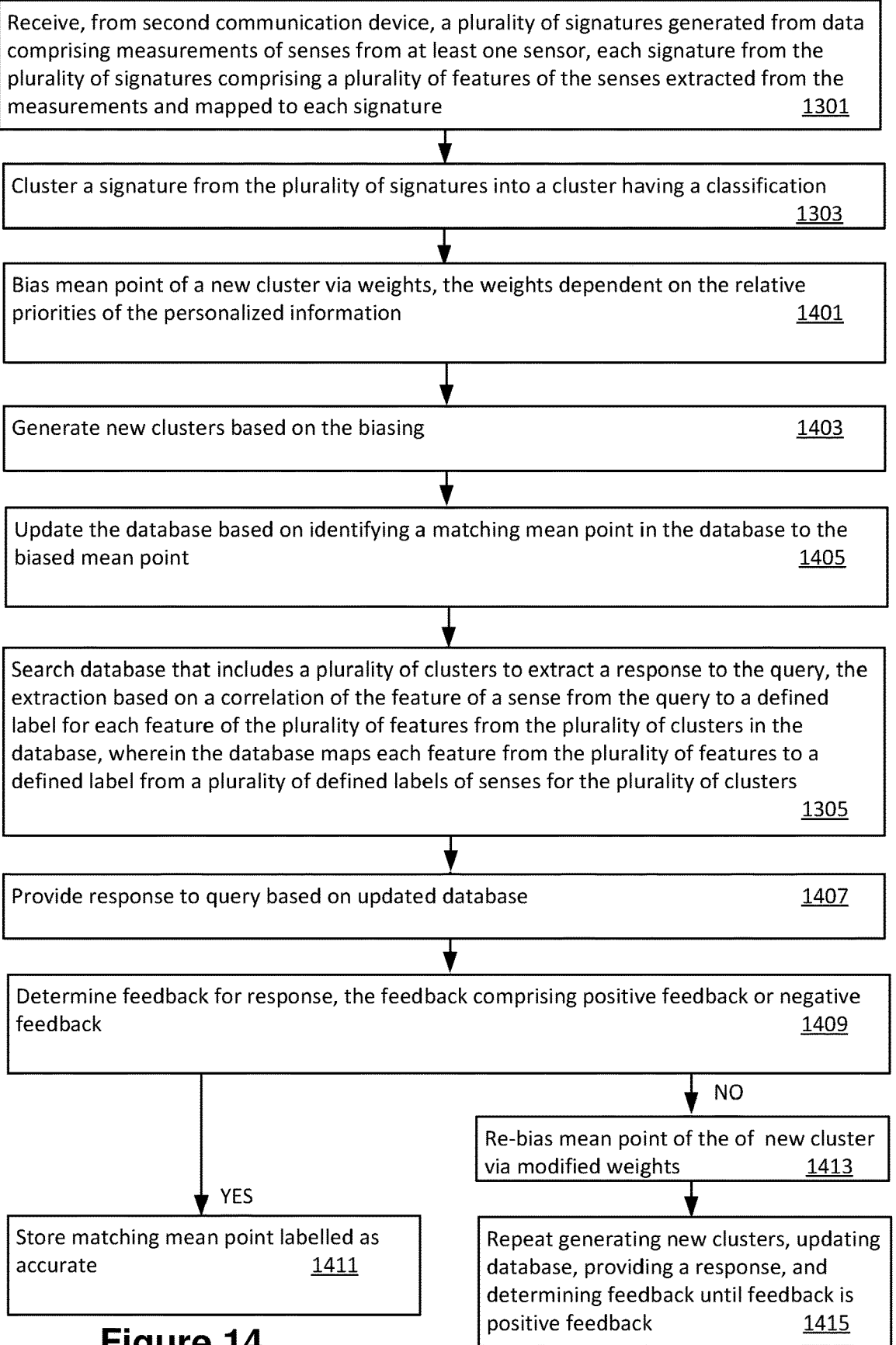

Receive, from second communication device, a plurality of signatures generated from data comprising measurements of senses from at least one sensor, each signature from the plurality of signatures comprising a plurality of features of the senses extracted from the measurements and mapped to each signature                          1301

Cluster a signature from the plurality of signatures into a cluster having a classification                          1303

Bias mean point of a new cluster via weights, the weights dependent on the relative priorities of the personalized information                          1401

Generate new clusters based on the biasing                          1403

Update the database based on identifying a matching mean point in the database to the biased mean point                          1405

Search database that includes a plurality of clusters to extract a response to the query, the extraction based on a correlation of the feature of a sense from the query to a defined label for each feature of the plurality of features from the plurality of clusters in the database, wherein the database maps each feature from the plurality of features to a defined label from a plurality of defined labels of senses for the plurality of clusters                          1305

Provide response to query based on updated database                          1407

Determine feedback for response, the feedback comprising positive feedback or negative feedback                          1409

NO

Re-bias mean point of the of new cluster via modified weights                          1413

YES

Store matching mean point labelled as accurate                          1411

Repeat generating new clusters, updating database, providing a response, and determining feedback until feedback is positive feedback                          1415

Figure 14

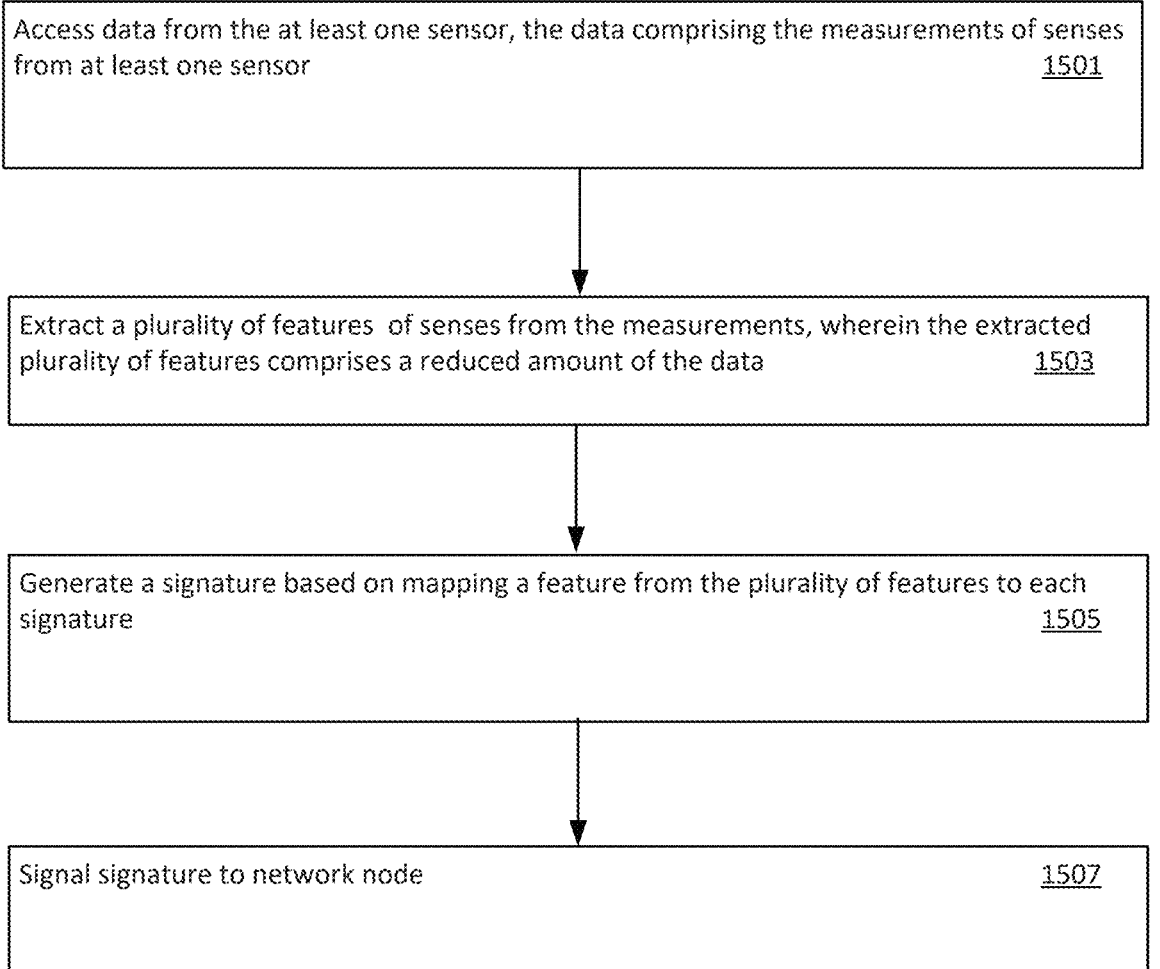

Access data from the at least one sensor, the data comprising the measurements of senses from at least one sensor                                                                                    1501

Extract a plurality of features  of senses from the measurements, wherein the extracted plurality of features comprises a reduced amount of the data                                            1503

Generate a signature based on mapping a feature from the plurality of features to each signature                                                                                                              1505

Signal signature to network node                                                                                                              1507

Figure 15

RESPONDING TO QUERIES RELATED TO A SENSE IN A COMMUNICATION NETWORK

CROSS REFERENCE TO RELATED APPLICATIONS

This application is a 35 U.S.C. § 371 national stage application of PCT International Application No. PCT/SE2021/050781 filed on Aug. 10, 2021, the disclosure and content of which is incorporated by reference herein in its entirety.

TECHNICAL FIELD

The present disclosure relates generally to methods for responding to a query of a communication device in a communication network related to a feature of a sense, and related methods and apparatuses.

BACKGROUND

The Internet of Things (IoT) and robust industrial communication is at the core of fifth generation (5G) technology. An objective of sixth generation (6G) technology is to provide multisensory insights that are practically indistinguishable from the real world. This is being instituted by the "Internet of Senses" (IoS). The IoS extends online sensory experiences beyond sight and sound of display devices, and has a goal of inclusion of sight, sound, taste, smell, and contact being a typical reality by 2030. To make use of this technology, robust frameworks are needed to interact with IoS systems including, e.g., sensory input management, knowledge search, aggregation, and actuation feedback Potential problems exist with robustness of current systems to answer queries related to a sense.

SUMMARY

Certain aspects of the disclosure and their embodiments may provide solutions to these or other challenges.

Various embodiments of the present disclosure, provide a method for searching and responding to a query related to a feature of a sense (e.g., for the IoS).

Certain embodiments may provide one or more of the following technical advantages. By including signatures extracted from data including measurements of a sense from a sensor and classifying the signatures, relevant features of senses may be extracted from raw sensor data and the signatures may be classified for searching including, without limitation, classification for personal preferences of a user of a communication device. An additional potential advantage may include improvement of searching and responding to queries related to a feature of a sense through learning, personalization, and query processing. For example, by providing an extracted signature of features of senses, the extracted signatures having reduced data dimensionality in comparison to the input data, network congestion and overhead in signalling data including about senses may be reduced. Further, reduction of network congestion and signalling overhead may aid in more scalable deployment with lower latency responses.

In various embodiments, a method performed by a network node in a communication network for responding to a query of a first communication device to a second communication device related to a feature of a sense is provided. The method comprises receiving, from the second communication device, a plurality of signatures generated from data comprising measurements of senses from at least one sensor. Each signature from the plurality of signatures includes a plurality of features of the senses extracted from the measurements and mapped to each signature. The method further comprises clustering a signature from the plurality of signatures into a cluster having a classification. The method further comprises searching a database that includes a plurality of clusters to extract a response to the query. The extraction based on a correlation of the feature of a sense from the query to a defined label for each feature of the plurality of features from the plurality of clusters in the database. The database maps each feature from the plurality of features to a defined label from a plurality of defined labels of senses for the plurality of clusters. The method further comprises signalling the response to the query of the first communication device.

In some embodiments, the clustering comprises personalized information, the personalized information includes relative priorities of the personalized information, and the method further comprises biasing the mean point of the new cluster via weights. The weights dependent on the relative priorities of the personalized information. The method further comprises generating new clusters based on the biasing.

In some embodiments, the method further comprises updating the database based on identifying a matching mean point in the database to the biased mean point. The method further comprises providing a response to the query based on the updated database; and determining feedback for the response. The feedback comprises positive feedback or negative feedback.

In some embodiments, the method further comprises, when the feedback is positive feedback, storing the matching mean point labelled as accurate.

In some embodiments, the method further comprises, when the feedback is negative, re-biasing the mean point of the of the new cluster via modified weights. The method further comprises repeating the generating new clusters, the updating the database, the providing a response, and the determining feedback until the feedback is positive feedback.

In other embodiments, a network node in a communication network for responding to a query of a first communication device to a second communication device related to a feature of a sense is provided. The network node includes at least one processor; and at least one memory connected to the at least one processor and storing program code that is executed by the at least one processor to perform operations comprising receive, from the second communication device, a plurality of signatures generated from data comprising measurements of senses from at least one sensor. Each signature from the plurality of signatures comprising a plurality of features of the senses extracted from the measurements and mapped to each signature. The operation further comprising cluster a signature from the plurality of signatures into a cluster having a classification. The operation further comprising searching a database that includes a plurality of clusters to extract a response to the query. The extraction based on a correlation of the feature of a sense from the query to a defined label for each feature of the plurality of features from the plurality of clusters in the database. The database maps each feature from the plurality of features to a defined label from a plurality of defined labels of senses for the plurality of clusters. The operations further comprising signal the response to the query of the first communication device.

In other embodiments, a network node in a communication network for responding to a query of a first communication device to a second communication device related to a feature of a sense is provided. The network node adapted to perform operations comprising receive, from the second communication device, a plurality of signatures generated from data comprising measurements of senses from at least one sensor. Each signature from the plurality of signatures comprising a plurality of features of the senses extracted from the measurements and mapped to each signature. The operation further comprising cluster a signature from the plurality of signatures into a cluster having a classification. The operation further comprising searching a database that includes a plurality of clusters to extract a response to the query. The extraction based on a correlation of the feature of a sense from the query to a defined label for each feature of the plurality of features from the plurality of clusters in the database. The database maps each feature from the plurality of features to a defined label from a plurality of defined labels of senses for the plurality of clusters. The operations further comprising signal the response to the query of the first communication device.

In other embodiments, a computer program comprising program code to be executed by processing circuitry of a network node is provided, whereby execution of the program code causes the network node to perform operations comprising receive, from the second communication device, a plurality of signatures generated from data comprising measurements of senses from at least one sensor. Each signature from the plurality of signatures comprising a plurality of features of the senses extracted from the measurements and mapped to each signature. The operation further comprising cluster a signature from the plurality of signatures into a cluster having a classification. The operation further comprising searching a database that includes a plurality of clusters to extract a response to the query. The extraction based on a correlation of the feature of a sense from the query to a defined label for each feature of the plurality of features from the plurality of clusters in the database. The database maps each feature from the plurality of features to a defined label from a plurality of defined labels of senses for the plurality of clusters. The operations further comprising signal the response to the query of the first communication device.

In other embodiments, a computer program product comprising a non-transitory storage medium including program code to be executed by processing circuitry of a network node is provided, whereby execution of the program code causes the network node to perform operations comprising receive, from the second communication device, a plurality of signatures generated from data comprising measurements of senses from at least one sensor. Each signature from the plurality of signatures comprising a plurality of features of the senses extracted from the measurements and mapped to each signature. The operation further comprising cluster a signature from the plurality of signatures into a cluster having a classification. The operation further comprising searching a database that includes a plurality of clusters to extract a response to the query. The extraction based on a correlation of the feature of a sense from the query to a defined label for each feature of the plurality of features from the plurality of clusters in the database. The database maps each feature from the plurality of features to a defined label from a plurality of defined labels of senses for the plurality of clusters. The operations further comprising signal the response to the query of the first communication device.

In other embodiments, a method performed by a communication device in a communication network for data extraction from measurements of senses from at least one sensor to generate a plurality of signatures is provided. The method comprises accessing data from the at least one sensor. The data comprising the measurements of senses from at least one sensor. The method further comprises extracting a plurality of features of senses from the measurements. The extracted plurality of features comprises a reduced amount of the data. The method further comprises generating a signature based on mapping a feature from the plurality of features to each signature; and signalling the signature to a network node.

In other embodiments, a communication device for data extraction from measurements of senses from at least one sensor to generate a plurality of signatures is provided. The communication device includes at least one processor; and at least one memory connected to the at least one processor and storing program code that is executed by the at least one processor to perform operations comprising access data from the at least one sensor. The data comprising the measurements of senses from at least one sensor. The operations further comprising extract a plurality of features of senses from the measurements, wherein the extracted plurality of features comprises a reduced amount of the data. The operations further comprising generate a signature based on mapping a feature from the plurality of features to each signature; and signal the signature to a network node.

In other embodiments, a communication device for data extraction from measurements of senses from at least one sensor to generate a plurality of signatures is provided. The communication device adapted to perform operations comprising access data from the at least one sensor. The data comprising the measurements of senses from at least one sensor. The operations further comprising extract a plurality of features of senses from the measurements, wherein the extracted plurality of features comprises a reduced amount of the data. The operations further comprising generate a signature based on mapping a feature from the plurality of features to each signature; and signal the signature to a network node.

In other embodiments, a computer program comprising program code to be executed by processing circuitry of a communication device is provided, whereby execution of the program code causes the communication device to perform operations comprising access data from the at least one sensor. The data comprising the measurements of senses from at least one sensor. The operations further comprising extract a plurality of features of senses from the measurements, wherein the extracted plurality of features comprises a reduced amount of the data. The operations further comprising generate a signature based on mapping a feature from the plurality of features to each signature; and signal the signature to a network node.

In other embodiments, a computer program product comprising a non-transitory storage medium including program code to be executed by processing circuitry of a communications device is provided, whereby execution of the program code causes the communication device to perform operations comprising access data from the at least one sensor. The data comprising the measurements of senses from at least one sensor. The operations further comprising extract a plurality of features of senses from the measurements, wherein the extracted plurality of features comprises a reduced amount of the data. The operations further comprising generate a signature based on mapping a feature from the plurality of features to each signature; and signal the signature to a network node.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating signature extraction, mapping, and searching according to some embodiments of the present disclosure;

FIG. 5 is a plot illustrating clustering of whiskey tastes;

FIGS. 13 and 14 are flow charts illustrating operations of a network node according to some embodiments of the present disclosure;

FIG. 15 is a flow chart illustrating operations of a communication device according to some embodiments of the present disclosure;

DETAILED DESCRIPTION

Figure 2:
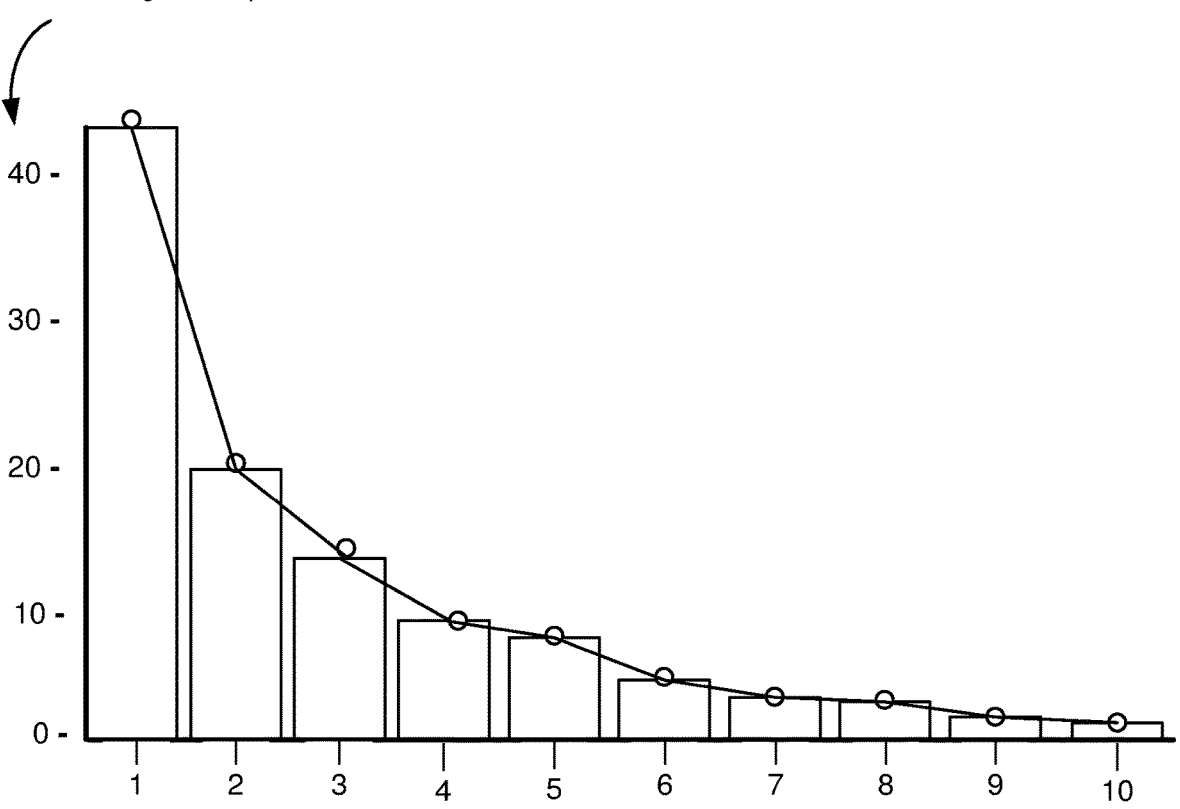
FIG. 2 is a plot illustrating a plot of percentage of variance (i.e., information) for each of 10 principal components from a principal components analysis.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The IoS senses adds additional dimensions such as touch, smell, and taste to traditional senses of audio and video. While there are robust search engines available to match audio or video feeds to a knowledge database via minimal signatures (e.g. https://www.shazam.com, such current systems are not robust enough to accurately answer queries such as "what does this taste like?", "what does this smell like?". Using tags or textual descriptions of flavors, tastes, smell, and touch may not be as accurate as searching using IoS specific data/sensors.

Additionally, complex queries related to a sense may be made to a search engine, such as:

"Can you suggest a food item with less than 100 calories that tastes like pizza and contains fruits?"

"Does my manufactured drink taste and smell the same across all my factories in different geographies?"

"Suggest a nearby garden with dominant smell of daisies"

Potential technical problems for searching and responding to queries related to a feature of a sense include, e.g.:

Matching a knowledge base of tastes, smells, and other senses via signatures taken from off the shelf sensors.

Personalizing a search to reflect varying tastes.

Transmitting such information over a network using a scalable and/or minimal signature profile.

Various embodiments of the present disclosure may provide potential technical advantages for responding to queries related to a feature of a sense. Potential advantages include that by using extracted signatures including a feature related to a sense, scalability and efficient searches and responses in a communication network may be obtained. A most relevant feature(s) signature(s) for efficient searching may be extracted from raw sensor data. Another potential advantage may be that by classifying the extracted signatures, the signature may be appended for personal preferences before searching. Through the use of clustering techniques and application of translation processes, factors for personal preferences may be incorporated. Yet another potential advantage mat be that by using a database correlating features related to senses (e.g., a knowledge graph of features related to senses, such as the IoS), the database may improve with continuous learning, personalization, and query processing. Through increased search and matching of relevant taste, smell, touch vectors, etc., the components of the system may be able to correlate appropriate samples with the database. The database may be used to send in minimal signatures for knowledge of types of food, smell, sound items, etc. By providing minimal signatures for senses, network congestion and overhead in signalling data about senses may be reduced. Further, reduction of network congestion and signalling overhead may aid in more scalable deployment with lower latency responses.

A further potential advantage of some embodiments may include an impact on businesses through use of the method. Based on use of the method, a communication network is aware of relevant information related to features of senses to be transmitted to an edge server, which may enable efficient IoS searches. Additionally, use of the method of some embodiments may include use the method for remote inspections, recommendations, and IoS based searches, as discussed further herein.

FIG. 1 is a diagram illustrating signature extraction, mapping, and searching according to some embodiments of the present disclosure. FIG. 1 includes an overview for feature mapping 107 sensory inputs 103 (such as touch, taste, smell, speech, and vision) from sensors 101 to relevant signatures 105 for feature extraction, clustering 109, and knowledge queries 111. Feature mapping 107 is performed using a data dimensionality process that maps sensory input data to signatures (e.g., principal components analysis (PCA), a machine learning (ML) model such as an autoencoder using a neural network, a deep ML model, etc.), as discussed further herein.

Signature extraction 105 receives inputs 103 from sensors 101 (e.g., off the shelf IoS sensors) and maps the raw data 103 to signatures. The input data 103 includes, e.g., time series data that is processed to relevant signatures. The signatures have a reduced data dimensionality compared to input data 103. By processing data 103 into signatures, faster and/or more efficient network transmission and searches may be enabled as a result of the reduction in data dimensionality. The signatures can include specific features that may help in the clustering process 109 with a minimal number of inputs.

Clustering process 109 compares and matches signatures with clusters. In some embodiments, such comparison and matching is used for mapping known centroids of clusters with the input data 103. In some embodiments, clustering process 109 can be refined iteratively. Taking the signatures 105 and features from feature mapping 107 as inputs, clustering process 109 can group relevant signatures within similar clusters for efficient knowledge searching.

Some embodiments include database traversal (e.g., illustrated as knowledge graph traversal 111, 113) and personalized matching based on a user profile 115. While a database such as a graph can be queried with information on specific food/taste/smell, etc. types that are similar (e.g., ontology, graph search), in some embodiments, specific geographic, age, and gender related information is also taken into account. In some embodiments, transformations of the clustering process 109 as well as knowledge graph queries 111, 113 are used to extract relevant information on a target of interest.

In some embodiments, interpolating 113 missing sensory information is included. In an example embodiment, direct knowledge graph queries are performed that interpret, e.g., the taste, smell, and texture of an item. In another example embodiment, the missing sense extraction 113 is appended with crowd sourcing information or knowledge obtained from dominant ingredients (e.g., adding knowledge to the database).

In summary, as illustrated in FIG. 1, in various embodiments of the present disclosure, signatures are generated 105 for sound, smell, taste, touch, etc. using a fundamental scale. The signatures are generated from inputting 103 sensor data from sensors (e.g., conventional sensors). Clustering process 109 and knowledge graph traversal 111, 113 are be used to identify relationships between signature extraction 105 and feature mapping 107 inputs. In some embodiments, knowledge graph traversal and mapping 111, 113 are performed to obtain similar tasting, smelling, sounding, etc. outputs. In some embodiments, crowd sourcing and feedback from users is included for learning, which may improve models performing feature mapping 107. In some embodiments, personalization is included based on age, location, gender, geography.

Various operations of FIG. 1 will now be discussed in more detail.

Signature extraction 105 uses sensory input data 103 from sensors 101 to extract signatures for clustering and feature mapping. This can provide technical advantages because, in the absence of signal extraction, attempting to use all, or a large amount of, sensory input data may result in undesirable network load (e.g., transmission of multidimensional data) which may add a heavy load to the network; sensing accuracy which may involve expensive sensors; and/or knowledge base granularity (e.g., storage and mapping to the knowledge base may be computationally complex); and other metrics. Thus, various embodiments of the present disclosure may provide a technical advantage based on signature extraction 105 from the sensory input data 103 which reduces an amount of data to be transmitted, and may impact a query rate on the knowledge base and accurate mapping to appropriate classes. Sensors 101 include, without limitation, off the shelf sensors. For example, an electronic nose (E-nose) sensor, a digital taste sensor, a digital touch sensor, etc.

For example, the following dataset illustrates time-series data recorded by an E-Nose sensor for an application of coffee quality control focused on detection of defects. The database includes 58 measurements of coffee divided into three groups and labeled as high quality (HQ), average quality (AQ), and low quality (LQ). The time series data was acquired at 1 Hz of sampling frequency for 300 seconds and corresponds to 300 data points per sensor. Each file in the dataset has eight columns with the resistance readings in kΩ of eight gas sensors: SP-12A, SP-31, TGS-813, TGS-842, SP-AQ3, TGS-823, ST-31, TGS-800. (See https://data.mendeley.com/datasets/7spd6fpvyk/1 (accessed on 17 Jul. 2021). The following is an excerpt from the dataset "HQ_04":

| 50.568114 | 79.801421 | 28.324864 | 27.211314 | 22.897838 |
|---|---|---|---|---|
| 53.728123 | 54.073617 | 45.212878 | 50.238644 | |
| 79.801421 | 28.031556 | 27.101170 | 22.733582 | |
| 53.543431 | 53.886708 | 45.078056 | 49.913080 | |
| 79.415608 | 28.148252 | 27.211314 | 22.733582 | |
| 53.177529 | 53.700984 | 45.212878 | 50.402887 | |
| 80.980393 | 28.089800 | 27.211314 | 22.897838 | |
| 53.728123 | 53.886708 | 45.078056 | 50.238644 | |
| 79.801421 | 28.089800 | 27.046383 | 22.733582 | |
| 53.543431 | 53.886708 | 44.810584 | 49.431904 | |
| 79.415608 | 28.324864 | 27.046383 | 22.733582 | |
| 53.543431 | 53.886708 | 44.545972 | 49.913080 | |
| 80.980393 | 27.973519 | 26.937373 | 22.856590 | |
| 53.359904 | 53.333046 | 44.943960 | 50.075378 | |

| | | | |
|---|---|---|---|
| 79.033302 | 28.089800 | 27.211314 | 22.652185 |
| 53.177529 | 54.261723 | 44.943960 | 50.402887 |
| 80.583764 | 27.973519 | 27.046383 | 22.815465 |
| 53.543431 | 53.886708 | 44.943960 | 49.913080 |
| 79.801421 | 28.148252 | 26.937373 | 22.733582 |
| 53.913990 | 53.516433 | 45.078056 | 49.431904 |
| 78.654455 | 28.265782 | 27.046383 | 22.652185 |
| 53.359904 | 54.261723 | 44.810584 | 50.075378 |
| 78.654455 | 28.148252 | 27.211314 | 22.652185 |
| 53.177529 | 54.261723 | 44.943960 | 51.069795 |
| 81.380729 | 28.384157 | 27.490040 | 23.232323 |
| 54.101043 | 54.451036 | 45.484726 | 49.913080 |
| 79.801421 | 28.089800 | 26.991785 | 22.774463 |
| 54.289294 | 53.886708 | 44.545972 | 50.568114 |
| 80.190790 | 28.563321 | 27.433906 | 23.105945 |
| 53.913990 | 54.641569 | 45.759552 | 49.591351 |
| 78.654455 | 28.265782 | 27.101170 | 22.692823 |
| 53.728123 | 53.886708 | 44.677923 | 49.913080 |
| 79.801421 | 28.089800 | 26.991785 | 22.733582 |
| 53.913990 | 53.333046 | 44.545972 | 49.591351 |
| 79.801421 | 28.206912 | 27.046383 | 22.733582 |
| 53.543431 | 53.886708 | 44.943960 | 50.402887 |
| 79.801421 | 28.089800 | 27.101170 | 22.774463 |
| 53.543431 | 53.886708 | 44.810584 | 49.431904 |
| 79.415608 | 28.089800 | 27.046383 | 22.774463 |
| 53.913990 | 53.700984 | 44.545972 | 50.238644 |
| 80.583764 | 27.915687 | 26.937373 | 22.897838 |
| 53.543431 | 53.516433 | 44.943960 | 49.431904 |
| 78.654455 | 28.206912 | 27.101170 | 22.692823 |
| 53.543431 | 54.261723 | 44.943960 | 49.913080 |
| 79.033302 | 28.031556 | 27.156147 | 22.652185 |
| 53.177529 | 54.261723 | 45.348433 | 49.751740 |
| 80.583764 | 28.031556 | 26.937373 | 22.856590 |
| 54.101043 | 53.333046 | 44.810584 | 49.913080 |
| 80.583764 | 27.973519 | 26.937373 | 22.815465 |
| 53.913990 | 53.333046 | 45.078056 | 50.238644 |
| 80.583764 | 27.915687 | 26.991785 | 22.856590 |
| 53.543431 | 53.516433 | 44.943960 | 50.568114 |
| 79.415608 | 28.563321 | 27.546370 | 23.022327 |
| 53.543431 | 55.026342 | 45.759552 | 50.734335 |
| 80.190790 | 28.324864 | 27.433906 | 23.064073 |
| 53.728123 | 54.451036 | 45.621764 | 49.751740 |
| 79.033302 | 27.973519 | 27.211314 | 22.692823 |
| 53.177529 | 54.261723 | 44.943960 | |

In various embodiments, a relevant feature(s) is extracted from the raw sensor data 103 (e.g., the E-Nose raw sensor data above) for mapping as signatures. The relevant feature(s) can be ingredients (e.g., for food), dominant smell, musical scales, etc. The extraction is a process that reduces dimensionality of the input data 103. In some embodiments, principal components analysis (PCA) is used to transform a number of variables in the input data 103 into a smaller number of variables that still contains most of the information of input data 103. PCA is a dimensionality reduction that identifies important relationships in the data, transforms the existing data based on these relationships, and then quantifies the importance of these relationships to keep the most important relationships and drop the others. Principal components are new variables that are constructed as linear combinations or mixtures of the initial variables. These combinations are done in such a way that the new variables (i.e., principal components) are uncorrelated and most of the information within the initial variables is squeezed or compressed into the first components. Thus, in an example, 10-dimensional data results in 10 principal components. PCA, however, tries to put maximum possible information in the first component, then maximum remaining information in the second component, and so on. FIG. 2 is a plot illustrating a plot of percentage of variance for each of 10 principal components. The x-axis of FIG. 2 shows 10 principal components, and the y-axis shows a percentage of variance for each of the 10 principal components. As illustrated in FIG. 2, principal component "1" contains the maximum information, principal component "2" contains maximum remaining information, and so on with respect to principal components 3-10. Organizing information in principal components in this way allows reduction of dimensionality of the input data without losing/losing only some information and allows discarding principal components with low information, while considering the remaining components as new variables.

In some embodiments, other techniques are used to extract features that map to a signature (e.g., a particular food type). Other techniques include, e.g., DNA sequencing, an autoencoder using a neural network, etc.

In some embodiments, an autoencoder using a neural network architecture is used to extract relevant features or signatures. The neural network architecture is a multi-layer perceptron with input and the desired signal being the same during training. Upon completion of training, the output of the encoder (typically, the dimension is less than the actual input dimension) is a compressed version of the input. While PCA is linear transformation, an autoencoder is a non-linear transformation for encoding the data into a lower dimensional space.

Figure 3:
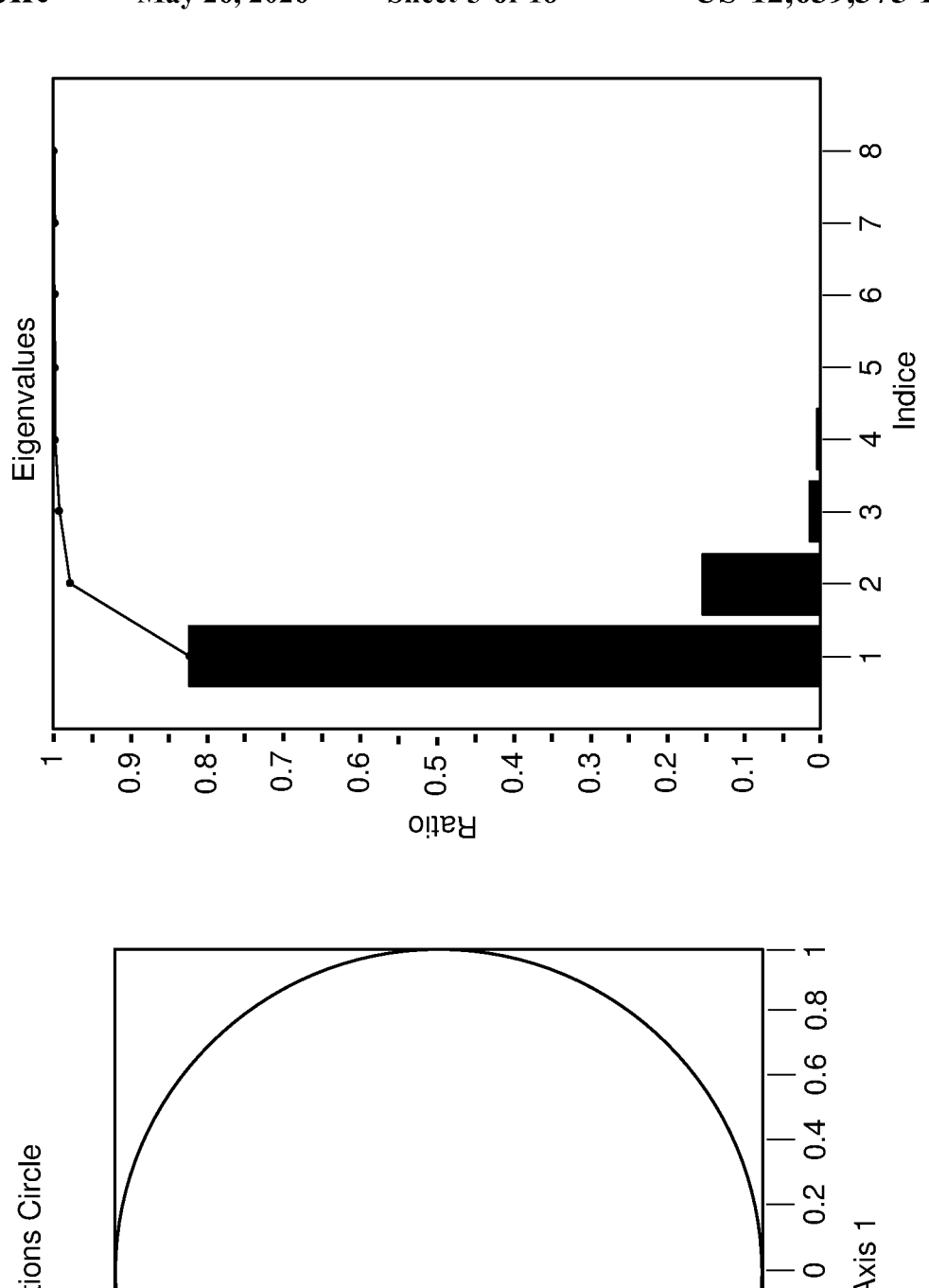
FIG. 3 is two plots illustrating principal components extracted in accordance with some embodiments of the present disclosure.
Figure 4:
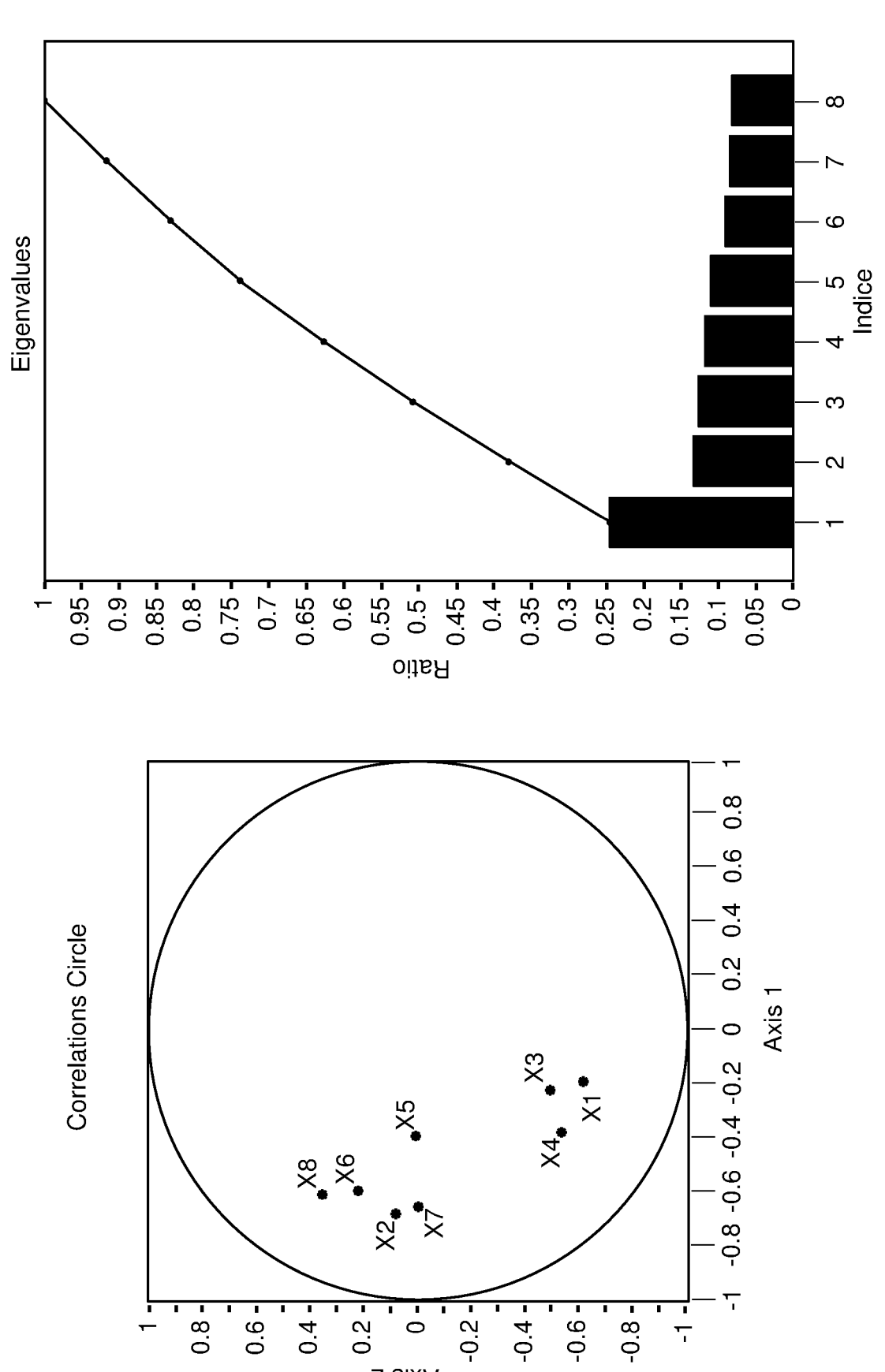
FIG. 4 is two plots illustrating signatures of the sample of FIG. 3 in accordance with some embodiments of the present disclosure.

In an example embodiment for the coffee dataset extracted via the E-Nose, PCA is used to extract over 300 sensor points dataset as shown in FIG. 3. As shown in FIG. 3, using PCA, only the first 2 Eigenvalues (i.e., coefficients attached to eigenvectors, that provide the amount of variance carried in each of the first 2 principal components) and corresponding Eigenvectors (i.e., directions of the axes where the most variance (i.e., most information) of the first 2 principal components) are used as signatures of the sample. The first 2 Eigenvalues and corresponding Eigenvectors are then used for clustering process 109, mapping process 111, and knowledge extraction process 113. This example embodiment may be contrasted with another example embodiment using a sample dataset where more features are to be transmitted for appropriate signature extraction.

Signature clustering process 109 is now discussed further. Collected signatures are clustered into categories such that the relevant parts of a database (e.g., a knowledge graph) can be searched. As used herein, "clustering" refers to dividing data points into homogenous (or near homogenous) classes or clusters:

Points in the same group are as similar as possible

Points in a different group are as dissimilar as possible

Figure 5:
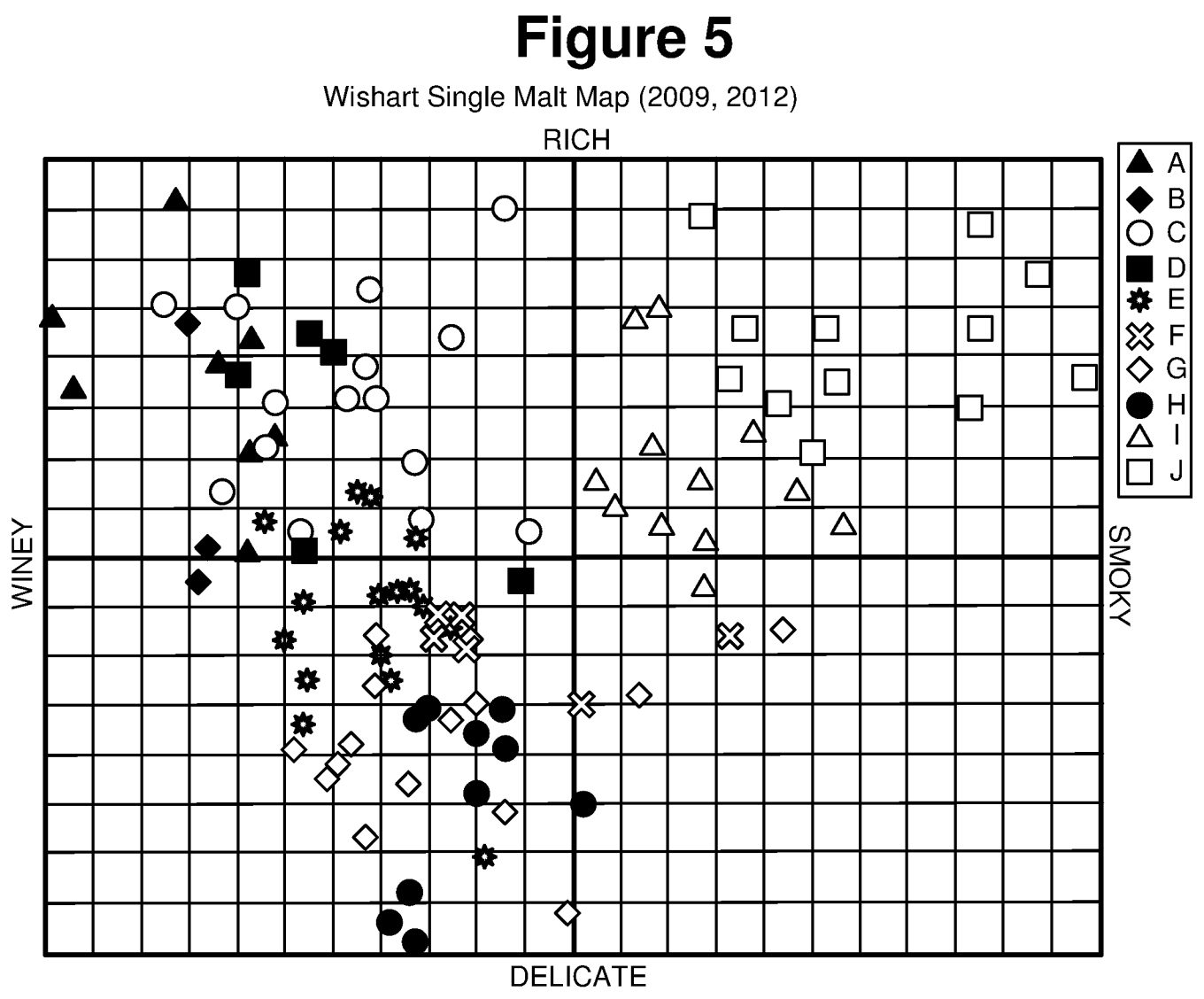

FIG. 5 is a plot illustrating clustering of whiskey tastes, based on Wishart Single Malt Map (2009, 2012).

When a collection of objects is given, objects are grouped based on similarity.

In some embodiments, the clustering is performed using a K-means algorithm. The K-Means algorithm of such embodiments includes the following operations:

Partition objects into k non-empty subsets;

Identify the cluster centroids (mean point) of a current partition;

Assign each mean point to a specific cluster;

Compute a distance(s) from each mean point and allot mean points to the cluster where the distance from the centroid is minimum; and After re-allotting the mean points, find the centroid of the new cluster formed.

Priority based clustering will now be discussed.

The way the collected signatures are clustered can influence the database (e.g., knowledge graph) queries. As discussed above, in some embodiments, a K-means algorithm is used to perform the clustering. While K-means clustering may a simple process for clustering, a K-means algorithm considers all the features in each signature with equal weights while clustering. A user of a communication device, however, may have different relative priorities for different features. For example, a user may have a higher priority for the feature "taste" compared to the feature "texture". Naïve K-means clustering may not be suitable for this scenario.

In some embodiments, the K-means is biased via weights dependent on location, age, geography, etc. For example, for a particular location, if the spice tolerance is high, even a spicy tasting food may be mapped as "bland".

In other embodiments, a priority-based clustering algorithm is used (e.g., Priority Based Soft Vector Quantization Feature Maps). Priority-based clustering algorithms consider a user relative priority of certain features over other features while clustering; which can result in personalized priority-based database (e.g., knowledge graph) and queries.

Figure 6:
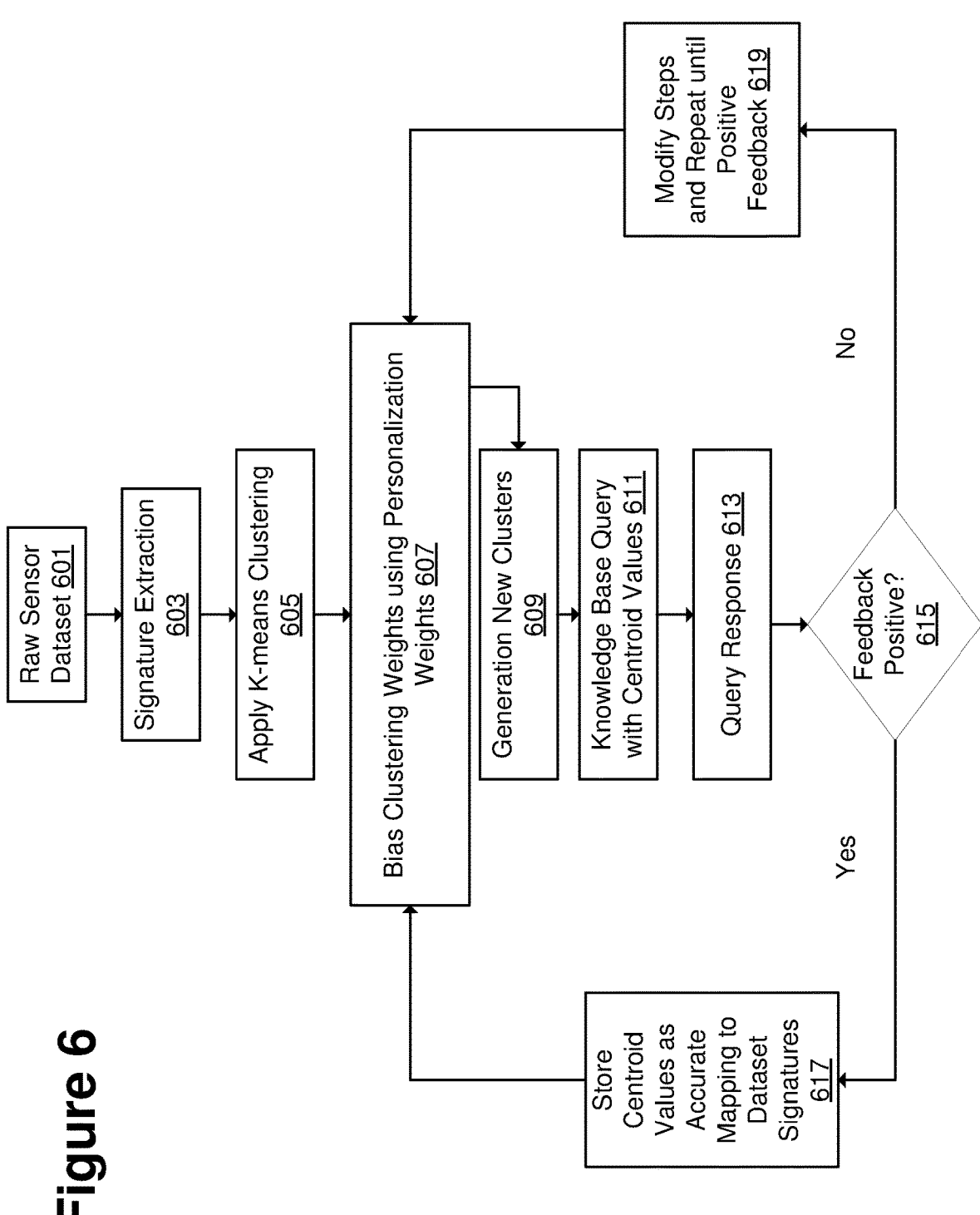
FIG. 6 is a flow chart illustrating operations for clustering, bias, and knowledge mapping in accordance with some embodiments of the present disclosure.

FIG. 6 is a flow chart illustrating operations for clustering, bias, and knowledge mapping in accordance with some embodiments of the present disclosure.

Referring to FIG. 6, raw sensor data is input 601 for signal extraction 603. K-means clustering 605 is applied. The K-means clustering is biased 607 via weights using personalization weights. The biased K-means are used to generate 609 new clusters. A query is received and the database is searched 611 for matching centroid values. A response to the query is provided 613.

In some embodiments, the method further includes optional operation 615. Optional operation 615 determines whether there is positive feedback to the response provided in operation 613. If there is positive feedback, the database is updated by storing 617 the centroid values as an accurate mapping to dataset signatures. If there is no positive feedback, process 619 is performed in which operations 607, 609, 611, and 613 are modified and repeated until positive feedback is obtained.

Clustering augmentation by including more input sources is now discussed.

Figure 7:
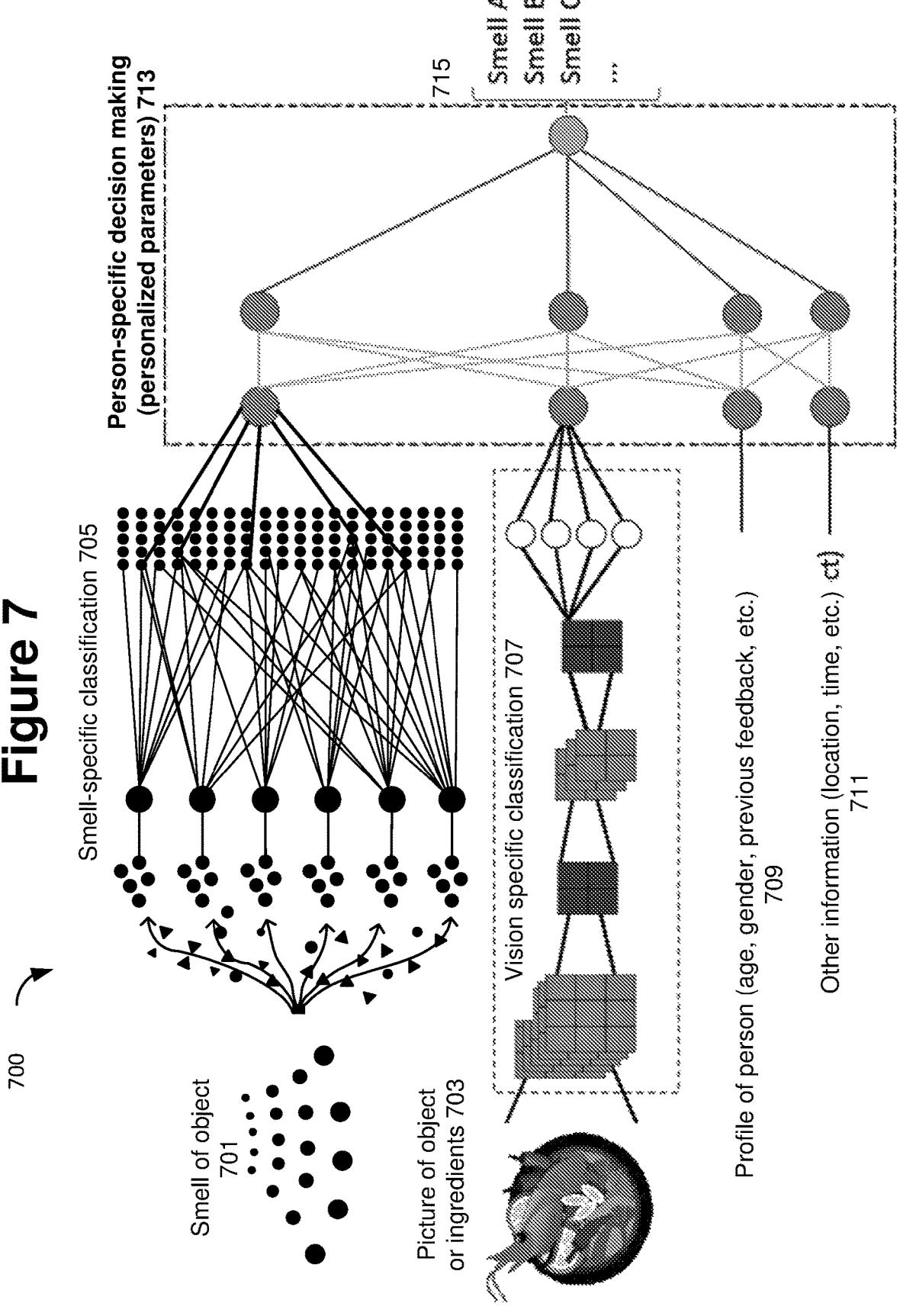
FIG. 7 is a diagram illustrating augmentation of clustering that takes preferences of a user into account in accordance with some embodiments of the present disclosure.

FIG. 7 is a diagram illustrating augmentation of clustering that takes preferences of a user into account in accordance with some embodiments of the present disclosure. The example embodiment of FIG. 7 represents how the clustering for one sense is augmented by combining received data from other senses as well as extra information about user profile and tempo-spatial information. In FIG. 7, smell data 701 (collected through a sensor (e.g., an artificial nose)) and a picture of food 703 go through sense-specific diagnostic artificial intelligence (AI) algorithms (e.g., smell-specific classification algorithm 705 and vision specific classification algorithm 707, respectively). The outputs from the sense specific diagnostic AI algorithms, along with further inputs from a user profile 709 (e.g., including age, gender, previous feedback, etc.) and service provider information 711 (e.g., location, time, etc.), are input to a personalized decision making algorithm 713 that takes into account the personalized parameters 709, 711 for final decision making to obtain output 715 (e.g., Smell A, Smell B, Smell C, etc.). These algorithms, sense-specific algorithms, e.g. for vision 707 and smell 705 in this example embodiment, can be universal or regional. In other words, in some embodiments, the sense-specific algorithms are trained based on information from crowdsourcing and feedback of users. On the other hand, the final algorithm 713 that combines the output of such sense-specific algorithms with the input from a user profile and service provider information is personalized.

Database (e.g., knowledge base) searching is now discussed further.

In some embodiments, searching of a database (e.g., graph searching of a large database of the IoS) in response to a query is performed in or near real time. In some embodiments, an initial graph is generated based on a fundamental scale of taste, smell, touch, ingredients, chemical composition, etc. Depending on a location of a communication device, information retrieval is cached. For example, relevant tastes in a restaurant are cached at an edge server for easy retrieval.

Figure 8:
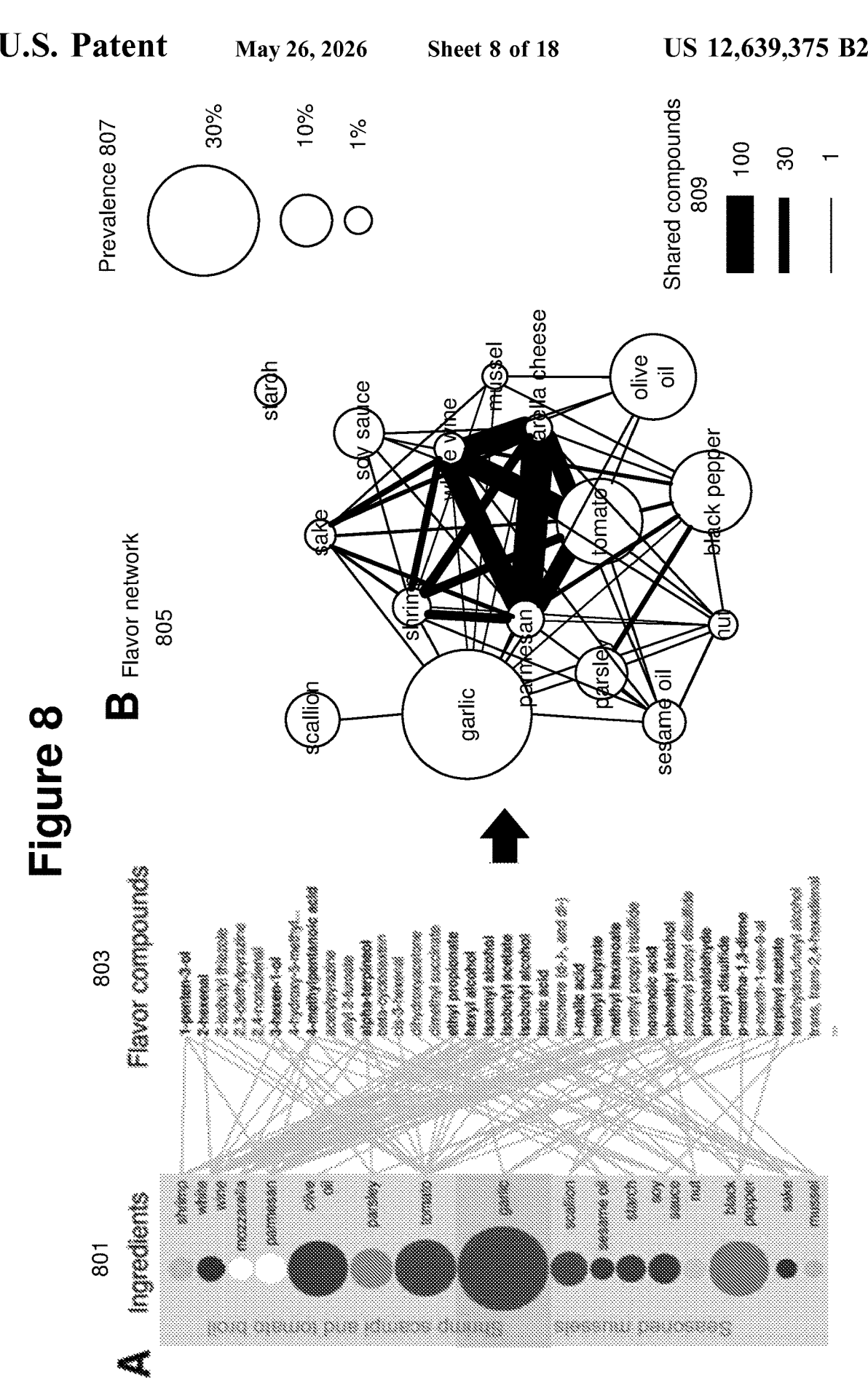
FIG. 8 is a diagram illustrating a graph generated based on ingredients in accordance with some embodiments of the present disclosure.

In some embodiments, the database is a graph; and graph search queries are used to extract responsive information. FIG. 8 is a diagram illustrating a graph generated based on ingredients in accordance with some embodiments of the present disclosure. In the example embodiment of FIG. 8, a "flavor network" graph 805 includes nodes (i.e., illustrated as different sized circles) for different ingredients 801 of "shrimp scampi and tomato broth" and "seasoned mussels" mapped to flavor compounds 803. The size of a node of the flavor network graph 805 indicates how prevalent 807 a particular ingredient is in the flavor network graph 805. For example, "garlic" has a prevalence 807 of 30%, "soy sauce" has a prevalence of 10%, "mussel" has a prevalence of 1%, etc. Flavor network graph 805 also includes an indication of the size of shared flavor components 809 between ingredients 801. The size of the lines (that is, the width of the lines in this example graph) connecting the nodes indicates the size of shared flavor components 809. For example, "parmesan cheese" and "mozzarella cheese" have 100 shared flavor compounds 803, "shrimp" and "tomato" have 30 shared flavor compounds 803, "nut" and "black pepper" have 1 shared flavor compound 803, etc.

The following two example embodiments illustrate how a query is translated in a graph database to extract relevant matching taste and smell information, respectively. In some embodiments, caching relevant information of the graph database on an edge server, in whole or in part, may reduce processing time.

In a first example embodiment, a graph database receives a query "Can you suggest a food item that tastes like pizza?" In response to the query, the graph database of this example embodiment outputs a response "Spanish coca" and "Pizzamajiccia" using "Gremlin", a graph traversal language:

```
gremlin> g.V(1).values('name') //
==>pizza
gremlin> g.V(1).outE('ingredients') /
==>e[7][1−has−>2]
==>e[8][1−has−>4]
gremlin> g.V(1).outE('has').inV( ).values('tastes like') /
==>Spanish coca
==>Pizzamajiccia
```

In a second example embodiment, a graph database receives a query "What does this item smell like?" In response to the query, the graph database of this example embodiment outputs a response "Lavender" using the Gremlin graph traversal language:

```
gremlin> g.V(1).values('name') //
==>unknown
gremlin> g.V(1).outE('dominant') /
==>e[7][1-has->2]
==>e[8][1-knows->4]
gremlin> g.V(1).outE('knows').inV( ).values('smells like') /
==>Lavender
```

Creating an initial dataset in a database is now discussed.

In some embodiments, the following steps are used to generate an initial database (e.g., a knowledge base) with a pre-known mapping of features of a sense (e.g., IoS) (e.g., taking a pre-known food item such as a margherita pizza, mapping senses (e.g., taste and smell) of the pre-known food item, and labelling the senses for the pre-known item in the database. The labelled items are used in subsequent queries to the database as the labelled items correspond to known sample data:

1. Using a spectrum of senses (e.g., taste range, smell range, touch range, etc.), identify a basic set of markers that may distinguish query items. For example, the smell of a chemical is in a different range compared to a food item. This is determined, e.g., by pre-trained accuracy of sensing hardware.
2. Input a known set of labelled items via sensing models. For example, taste range of a food (e.g., pizza, curry, cake, chips, etc.) is evaluated by the sensors and provided onto a knowledge base or clustering map. These can be representative values, but the values anchor the knowledge base to certain known labels. A similar procedure can be repeated for smell, touch, and sounds.
3. When a new query or sensing evaluation is made, a response can be close to or midway between multiple markers. In some embodiments, feedback from the user is used to draw boundaries among taste types (for example, the standard deviation of pizza is range X).
4. Sensors (e.g., IoS sensors) can be located on a communication device (e.g., on a cellular phone or other wearable). Additionally, crowdsourced datasets can quickly populate and improve the knowledge base.

An actuation framework will now be discussed. While some embodiments herein have been discussed in the context of search queries and responses, additional embodiments include closed loop actuation for machine-to-machine communication frameworks where a machine queries a database about configuration changes the machine is to make. In one embodiment, an automated cooker is to cook vegetables to an optimal "taste" point. Sensing information is periodically sent to a query engine to map the taste output. The cooker then changes a heating rate to maximize a probability of producing vegetables that match a taste profile. In other embodiments, such a system is used in a food processing factory, e.g., to choose an optimal mixing rate for chocolate mixing, etc.

Various example use cases will now be discussed.

In some embodiments, crowdsourced location sensing is included. From multiple sensors in a given location, a search can identify dominant senses in a location. Using similar mapping discussed herein, search items, places, events, etc. are labeled as "noisy", "fragrant", "cheese tasting", etc.

Based on inclusion of crowdsourced location sensing, locations having a particular feature may be identified. For example, identifying a traffic route thorough low noise routes; identifying a restaurant that is quiet, etc.

In some embodiments, information relevant to childcare or healthcare is identified. For example, some parents, childcare, or healthcare service providers could miss the ability to accurately sense, e.g., a taste or smell of a food or ingredient (e.g., temporally after having a cold, or due to doubt). In such a case, the method of various embodiments of the present disclosure can be used in a service used by parents, service providers, etc. of infants, children, elderly people, etc. For example, referring to FIG. 7, in this use case, information about gender, age, physical condition, and health of the client can be combined with the output of sensors used for tasting and smelling of food, and a decision for the suitability of the food is taken.

In some embodiments, information relevant to an allergy or health search is identified. For example, in response to the query "What would happen when I eat this?", the method and components of the present disclosure can map allergic, cholesterol, heat causing, etc. Such responsive information can be generated from the picture of a food mapped to dominant ingredients, allergic food categories, and flavors. A further potential advantage of such embodiments is the inclusion of flavor information. For example, a current approach of recommendation is based on tags and/or word descriptions of food items and flavors that lacks the accuracy of actual flavor profiles.

In some embodiments, information relevant to remote inspection is identified. Remote inspection in some current approaches is dominated by audio and/or video and lacks other features of senses. In contrast, in some embodiments, checking for other information is included, e.g. checking for gas leaks, chemicals, avoidable sounds, etc. in factories. Gas sensors include, e.g., methane, ethanol, toluene, o-xylene (an aromatic hydrocarbon based on benzene), $CO_2$, and $CH_4$. In another embodiment, in food safety, the method and components of the present disclosure are used to determine the quality of tea, milk, alcoholic beverages, fruits, meats, fishes, cheese, other dairy products, etc.

In some embodiments for remote inspection, human vision and/or taste may not be sufficient and other signatures are used. In an example embodiment, infrared and other spectrum signatures are used to append information from visual inspection. Similarly, taste and/or smell spectrums of certain animals can also be used in conjunction with conventional sensor clustering to bias the end reading.

Figure 9:
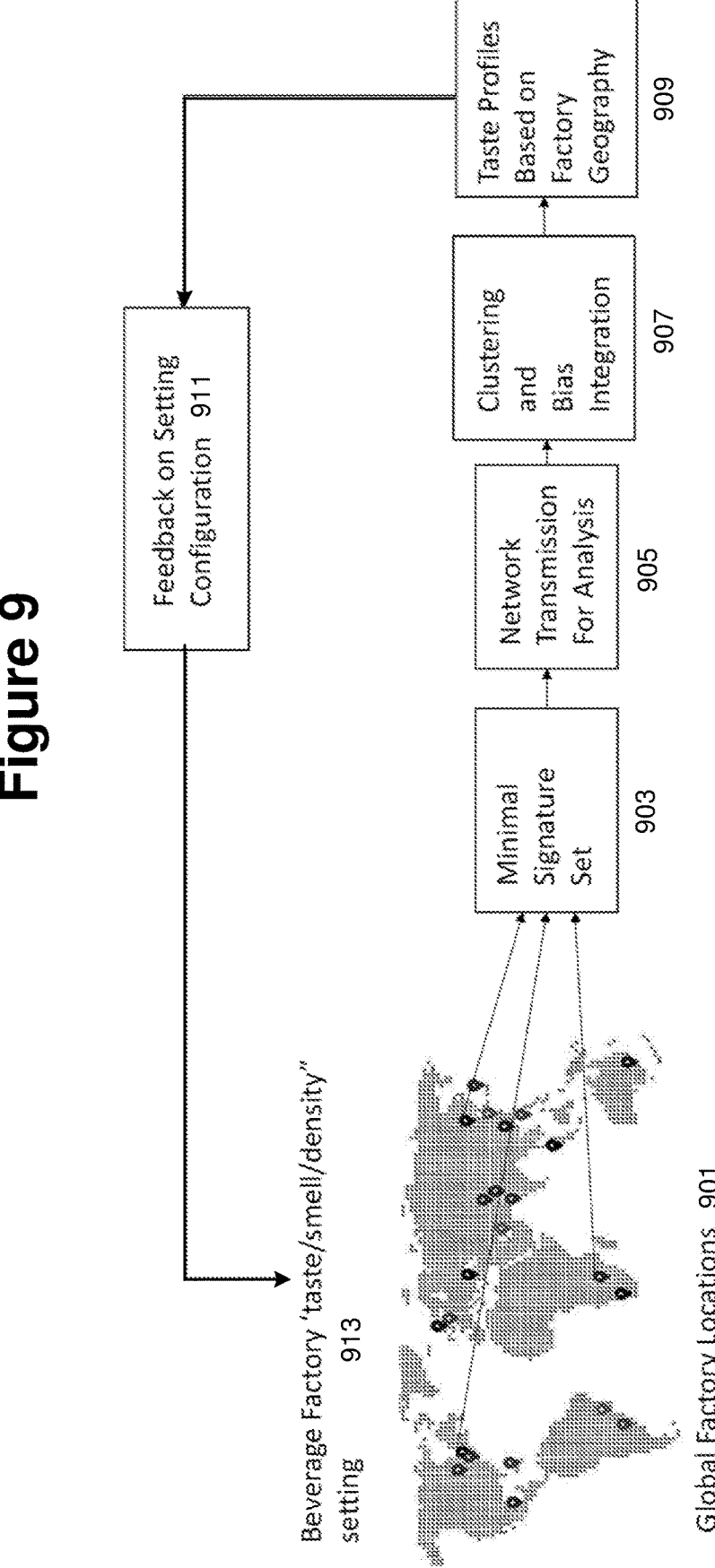
FIG. 9 is a flowchart illustrating operations on a global scale in accordance with some embodiments of the present disclosure.

In some embodiments, a combination of localization and classification can be used as a global scale. FIG. 9 is a flowchart illustrating operations on a global scale in accordance with some embodiments of the present disclosure. Referring to FIG. 9, a global quality check on a food item (e.g., coca cola) is performed in response to the query "Does my coca cola product taste the same globally?" This example embodiment includes a combination of 5G and/or 6G communication systems with sensors (e.g., IoS sensors). A manufacturer making a coca cola product has input information from which a signature set 903 is generated for its factories 901 located throughout the world. In accordance with some embodiments, the signature set 903 is transmitted over the communication network (e.g., 5G and/or 6G) for a quality check analysis 905 without physical samples of the coca cola product. At least some factory locations 901 include certain ingredients and/or manufacturing processes that are changed to account for accurate taste across all locations. By including biasing with personalized details in the clustering 907, taste profiles based on a geographic location of a factory are obtained. Based on the taste profiles 909, feedback is identified for a setting configuration 911 for taste, smell, density, etc. settings 913 at each factory 901. By including the clustering and bias integration 907, deviations due to ingredients, water purification techniques, coloring, etc. may be mitigated.

A database search and a resulting recommendation are now discussed further. In an example embodiment, the query is "Can you suggest a food item with less than 100 calories that tastes like pizza and contains fruits?; and the database is a knowledge graph. The search of the knowledge graph is performed via inverse learning on a graph search. Additionally, reasoning techniques on top of graph databases can be used. In some embodiments, crawlers on the knowledge graph store relevant knowledge to be transmitted as answers to queries as illustrated below:

```
# Reasoning
match
$a isa food item;
$b isa calorie count, has value 100;
$c isa food item;
($a, $b) isa food-calorie map;
($a, $c) isa food-closeness map;
get $a;
results>>
$a isa food item, has name "Roti";
```

Figure 10:
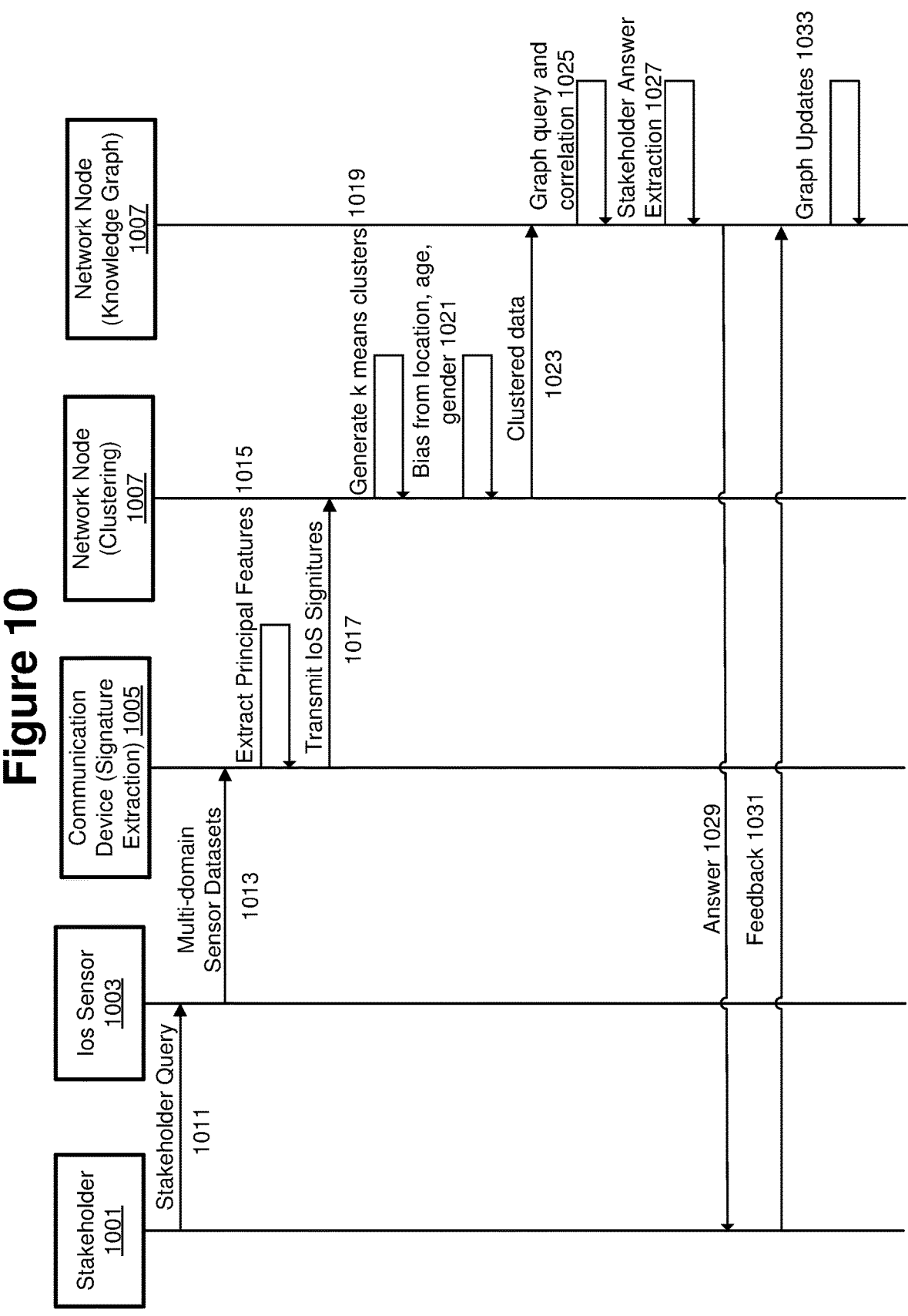
FIG. 10 is a sequence diagram illustrating operations related to search in accordance with some embodiments of the present disclosure.

FIG. 10 is a sequence diagram illustrating operations related to search in accordance with some embodiments of the present disclosure. FIG. 10 illustrates operations among a stakeholder 1001 (e.g., a communication device), IoS sensor 1003, communication device 1005, and network node 1007 including (or communicatively connected to) a clustering component and a knowledge graph. While the embodiment of FIG. 10 is explained in the non-limiting context of stakeholder 1001, communication device 1005, and network node 1007, the invention is not so limited. Instead, other devices and configuration of devices may be used as discussed herein.

Referring to FIG. 10, in operation 1011, stakeholder 1001 submits a query to IoS sensor 1003. IoS sensor 1003 generates multiple sensory domain datasets (e.g., taste, touch, smell, vision, combinations thereof, and/or knowledge base concepts within the query) and signals 1013 the multi-domain datasets to communication device 1005 for signature extraction. In operation 1015, communication device 1005 extracts signatures comprising features (e.g., using PCA as discussed herein). In operation 1017, communication device 1005 signals the signatures to network node 1007. Network node 1007 generates 1019 k-means clusters from the signatures as discussed herein. Network node 1007 biases 1021 the clustered signatures using location, age, and gender information of a user of stakeholder 1001 as discussed herein. In operation 1023, network node 1007 signals/provides the biased, clustered data to a knowledge graph. In this example embodiment, network node 1007 includes the knowledge graph. In other embodiments, network node is communicatively connected to a knowledge graph located at another network node (e.g., a repository, a server, another network node, etc.) In operation 1025, a graph query and correlation of the knowledge graph is performed as described herein. In operation 1027, an answer is extracted from the results of the graph query and correlation. The answer is signaled to stakeholder 1001 in operation 1029. Feedback regarding the answer from stakeholder 1001 is signalled 1031 to the knowledge graph. In operation 1033, network node 1007 updates the knowledge graph based on the received feedback.

Figure 11:
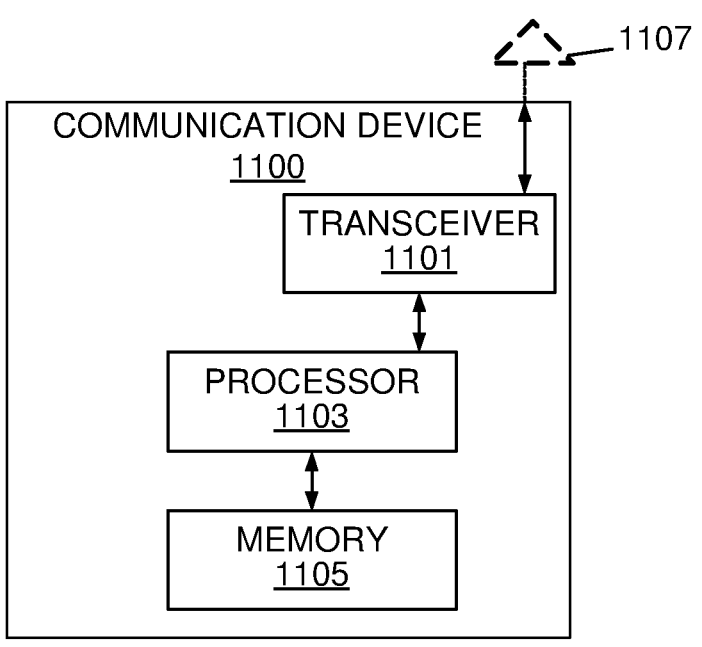
FIG. 11 is a block diagram illustrating a communication device according to some embodiments of the present disclosure.

FIG. 11 is a block diagram illustrating elements of a communication device 1100 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 1100 may be provided, for example, as discussed below with respect to wireless devices UE QQ112A, UE QQ112B, and wired or wireless devices UE QQ112C, UE QQ112D of FIG. 16, UE QQ200 of FIG. 17, and virtualization hardware QQ504 and virtual machines QQ508A, QQ508B of FIG. 20, all of which should be considered interchangeable in the examples and embodiments described herein and be within the intended scope of this disclosure, unless otherwise noted.) As shown, communication device UE may include an antenna 1107 (e.g., corresponding to antenna QQ222 of FIG. 17), and transceiver circuitry 1101 (also referred to as a transceiver, e.g., corresponding to interface QQ212 of FIG. 17 having transmitter QQ218 and receiver QQ220) including a transmitter and a receiver configured to provide uplink and downlink radio communications with a base station(s) (e.g., corresponding to network node QQ110A, QQ110B of FIG. 16, network node QQ300 of FIG. 18. Communication device 1100 may also include processing circuitry 1103 (also referred to as a processor, e.g., corresponding to processing circuitry QQ202 of FIG. 17, and control system QQ512 of FIG. 20) coupled to the transceiver circuitry, and memory circuitry 1105 (also referred to as memory, e.g., corresponding to memory QQ210 of FIG. 16) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that separate memory circuitry is not required. Communication device 1100 may also include an interface (such as a user interface) coupled with processing circuitry 1103, and/or communication device 1100 may be incorporated in a vehicle.

As discussed herein, operations of communication device 1100 may be performed by processing circuitry 1103 and/or transceiver circuitry 1101. For example, processing circuitry 1103 may control transceiver circuitry 1101 to transmit communications through transceiver circuitry 1101 over a radio interface to a radio access network node and/or to receive communications through transceiver circuitry 1101 from a network node (e.g., network node 1007) over a radio interface. Moreover, modules may be stored in memory circuitry 1105, and these modules may provide instructions so that when instructions of a module are executed by processing circuitry 1103, processing circuitry 1103 performs respective operations (e.g., operations discussed below with respect to Example Embodiments relating to communication devices). According to some embodiments, a communication device 1100 and/or an element(s)/function (s) thereof may be embodied as a virtual node/nodes and/or a virtual machine/machines.

Figure 12:
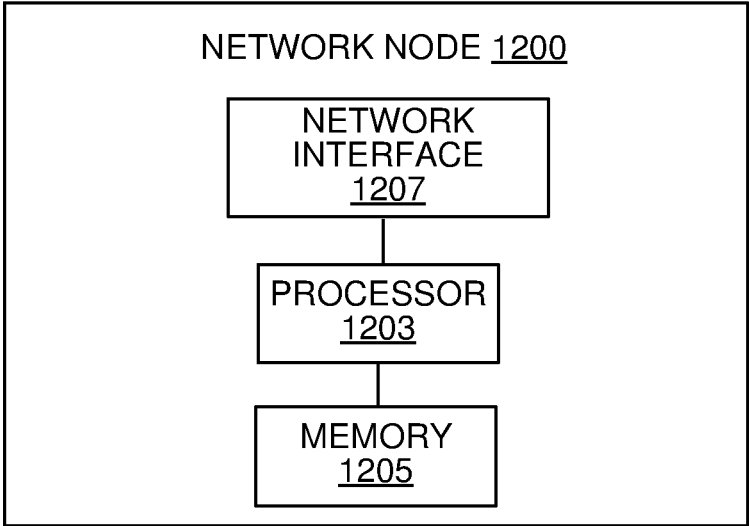
FIG. 12 is a block diagram illustrating a network node according to some embodiments of the present disclosure.

FIG. 12 is a block diagram illustrating elements of a network node 1200 (also referred to as a server, a cloud-based server, an edge server, a radio access network node, base station, radio base station, eNodeB/eNB, gNodeB/ gNB, etc.) of a communication network (e.g., a RAN configured to provide cellular communication) according to embodiments of inventive concepts. (Network node 1200 may be provided, for example, as discussed below with respect to network node QQ110A, QQ110B of FIG. 16, network node QQ300 of FIG. 18, hardware QQ504 and/or virtual machine QQ508A, QQ508B of FIG. 20, all of which should be considered interchangeable in the examples and embodiments described herein and be within the intended scope of this disclosure, unless otherwise noted.) As shown, the network node may include transceiver circuitry 1201 (also referred to as a transceiver, e.g., corresponding to portions of RF transceiver circuitry QQ312 and radio front end circuitry QQ318 of FIG. 18) including a transmitter and a receiver configured to provide uplink and downlink radio communications with mobile terminals. The network node may include network interface circuitry 1207 (also referred to as a network interface, e.g., corresponding to portions of communication interface QQ306 of FIG. 18) configured to provide communications with other nodes (e.g., with other network nodes, communication devices, and/or data repositories) of the communication network. The network node may also include processing circuitry 1203 (also referred to as a processor, e.g., corresponding to processing circuitry QQ302 of FIG. 18) coupled to the transceiver circuitry, and memory circuitry 1205 (also referred to as memory, e.g., corresponding to memory QQ304 of FIG. 18) coupled to the processing circuitry. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that a separate memory circuitry is not required.

As discussed herein, operations of the network node may be performed by processing circuitry 1203, network interface 1207, and/or transceiver 1201. For example, processing circuitry 1203 may control transceiver 1201 to transmit downlink communications through transceiver 1201 over a radio interface to one or more mobile terminals UEs and/or to receive uplink communications through transceiver 1201 from one or more communication devices over a radio interface. Similarly, processing circuitry 1203 may control network interface 1207 to transmit communications through network interface 1207 to one or more other network nodes and/or to receive communications through network interface from one or more other network nodes, communication devices, etc. Moreover, modules may be stored in memory 1205, and these modules may provide instructions so that when instructions of a module are executed by processing circuitry 1203, processing circuitry 1203 performs respective operations (e.g., operations discussed below with respect to Example Embodiments relating to network nodes). According to some embodiments, network node 1200 and/or an element(s)/function(s) thereof may be embodied as a virtual node/nodes and/or a virtual machine/machines.

According to some other embodiments, a network node may be implemented as a core network node without a transceiver. In such embodiments, transmission to a communication device, another network node, etc. may be initiated by the network node 1200 so that transmission to the communication device, network node, etc. is provided through a network node 1200 including a transceiver (e.g., through a base station or RAN node). According to embodiments where the network node is a RAN node including a transceiver, initiating transmission may include transmitting through the transceiver.

Operations of a network node (e.g., network node 1007) (implemented using the structure of FIG. 12) will now be discussed with reference to the flow charts of FIGS. 13 and 14 according to some embodiments of the present disclosure. In the description that follows, while the network node may be any of the network node 1200, network node QQ110A, QQ110B, QQ300, QQ606, hardware QQ504, or virtual machine QQ508A, QQ508B, the network node 1200 shall be used to describe the functionality of the operations of the network node. For example, modules may be stored in memory 1205 of FIG. 12, and these modules may provide instructions so that when the instructions of a module are executed by respective network node processing circuitry 1203, processing circuitry 1203 performs respective operations of the flow chart.

Referring to FIG. 13, a method performed by a network node (e.g., 1007, 1200) in a communication network for responding to a query of a first communication device (e.g., 1001, 1100) to a second communication device (e.g., 1005, 1100) related to a feature of a sense is provided. The method includes receiving (1301), from the second communication device, a plurality of signatures generated from data including measurements of senses from at least one sensor. Each signature is from the plurality of signatures including a plurality of features of the senses extracted from the measurements and mapped to each signature. The method further includes clustering (1303) a signature from the plurality of signatures into a cluster having a classification. The method further includes searching (1305) a database that includes a plurality of clusters to extract a response to the query. The extraction is based on a correlation of the feature of a sense from the query to a defined label for each feature of the plurality of features from the plurality of clusters in the database. The database maps each feature from the plurality of features to a defined label from a plurality of defined labels of senses for the plurality of clusters. The method further includes signalling (1307) the response to the query of the first communication device.

In some embodiments, the measurements of senses from at least one sensor include measurement data for at least one of a sense of touch, taste, smell, speech, and vision.

In some embodiments, the signature includes one of a two-dimensional map of values of the plurality of features, a three-dimensional map of values of the plurality of features, and a vector of values of the plurality of features.

In some embodiments, the clustering classifies the signature based on a comparison of the signature with signatures in the cluster having the classification.

In some embodiments, the clustering further includes personalized information of the first communication device from the query. The personalized information including at least one of geography, age, and gender of one of the first communication device and a user of the first communication device.

In some embodiments, the clustering includes partitioning the plurality of signatures into subsets of signatures; identifying a mean point of each subset of signatures; assigning each mean point to a cluster of the plurality of clusters; computing a distance from each mean point to the cluster; re-allotting the mean point to a new cluster where the distance from the mean point is a minimum distance; and finding the mean point of the new cluster.

Referring now to FIG. 14, in some embodiments, the personalized information includes relative priorities of the personalized information, and the method further includes biasing (1401) the mean point of the new cluster via weights. The weights dependent on the relative priorities of the personalized information. The method further includes generating (1403) new clusters based on the biasing.

In some embodiments, the method further includes updating (1405) the database based on identifying a matching mean point in the database to the biased mean point. The method further includes providing (1407) a response to the query based on the updated database. The method further includes determining (1409) feedback for the response. The feedback includes positive feedback or negative feedback.

In some embodiments, the method further includes, when the feedback is positive feedback, storing (1411) the matching mean point labelled as accurate.

In some embodiments, the method further includes, when the feedback is negative, re-biasing (1413) the mean point of the of the new cluster via modified weights. The method further includes repeating (1415) the generating (1403) new clusters, the updating (1405) the database, the providing (1407) a response, and the determining (1409) feedback until the feedback is positive feedback.

In some embodiments, the database comprises a graph database.

Various operations from the flow chart of FIG. 14 may be optional with respect to some embodiments of a method performed by a network node. For example, operations of blocks 1401-1415 of FIG. 14 may be optional.

Operations of a communication device (e.g., communication device 1005) (implemented using the structure of FIG. 11) will now be discussed with reference to the flow charts of FIG. 15 according to some embodiments of the present disclosure. In the description that follows, while the communication device may be any of the communication device 1100, wireless device QQ112A, QQ112B, wired or wireless devices UE QQ112C, UE QQ112D, UE QQ200, virtualization hardware QQ504, virtual machines QQ508A, QQ508B, or UE QQ606, the communication device 1100 shall be used to describe the functionality of the operations of the communication device. For example, modules may be stored in memory 1105 of FIG. 11, and these modules may provide instructions so that when the instructions of a module are executed by respective first communication device processing circuitry 1103, processing circuitry 1103 performs respective operations of the flow charts.

Referring first to FIG. 15, a method performed by a communication device (e.g., 1005, 1100) in a communication network for data extraction from measurements of senses from at least one sensor to generate a plurality of signatures is provided. The method includes accessing (1501) data from the at least one sensor. The data including the measurements of senses from at least one sensor. The method further includes extracting (1503) a plurality of features of senses from the measurements. The extracted plurality of features includes a reduced amount of the data. The method further includes generating (1505) a signature based on mapping a feature from the plurality of features to each signature. The method further includes signalling (1507) the signature to a network node.

In some embodiments, the measurements of senses from the at least one sensor include measurement data for at least one of a sense of touch, taste, smell, speech, and vision.

In some embodiments, the signature includes one of a two-dimensional map of values of the plurality of features, a three-dimensional map of values of the plurality of features, and a vector of values of the plurality of features.

Although communication device 1100 and network node 1200 are illustrated in the example block diagrams of FIGS. 11 and 12 each may represent a device that includes the illustrated combination of hardware components, other embodiments may comprise communication devices and network nodes with different combinations of components. It is to be understood that each of a communication device and a network node comprise any suitable combination of hardware and/or software needed to perform the tasks, features, functions, and methods disclosed herein. Moreover, while the components of each of a communication device and a network node are depicted as single boxes located within a larger box, or nested within multiple boxes, in practice, each device may comprise multiple different physical components that make up a single illustrated component (e.g., a memory may comprise multiple separate hard drives as well as multiple RAM modules).

Figure 16:
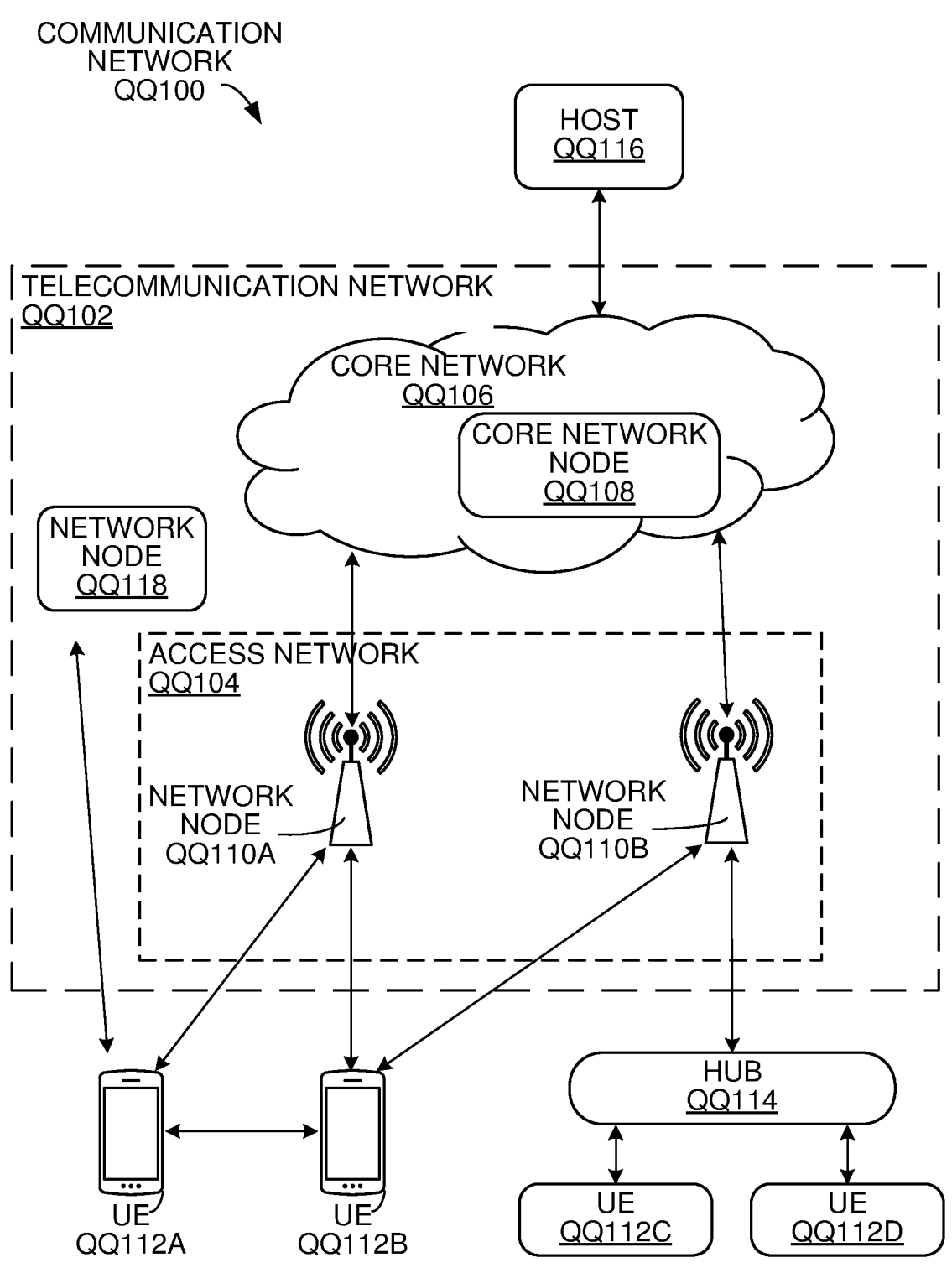
FIG. 16 is a block diagram of a communication system in accordance with some embodiments of the present disclosure.

FIG. 16 shows an example of a communication network QQ100 in accordance with some embodiments.

In the example, the communication network QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110*a* and QQ110*b* (one or more of which may be generally referred to as network nodes QQ110), or any other similar 3rd Generation Partnership Project (3GPP) access node or non-3GPP access point. The network nodes QQ110 facilitate direct or indirect connection of user equipment (UE), such as by connecting UEs QQ112*a*, QQ112*b*, QQ112*c*, and QQ112*d* (one or more of which may be generally referred to as UEs QQ112) to the core network QQ106 over one or more wireless connections. Telecommunication network QQ102 also includes one or more network nodes QQ118, which may be a cloud-implemented network node (e.g., a server) or an located in the cloud or an edge-implemented network node (e.g., a server). Network node QQ118 facilitates direct or indirect connection of communication devices, such as by connecting communication devices QQ112*a*, QQ112*b*, QQ112*c*, and QQ112*d* (one or more of which may be generally referred to as communication devices/UEs QQ112) to the communication network QQ100 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication network QQ100 may include any number of wired or wireless networks, network nodes, communication devices, and/or any other components or systems that may facilitate or participate in the communication of data and/or signals whether via wired or wireless connections. The communication network QQ100 may include and/or interface with any type of communication, telecommunication, data, cellular, radio network, and/or other similar type of system including, but not limited to, a 5G and/or 6G network.

The UEs QQ112 may be any of a wide variety of communication devices, including wireless devices arranged, configured, and/or operable to communicate wirelessly with the network nodes QQ110, QQ118 and other communication devices. Similarly, the network nodes QQ110, QQ118 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102, and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication network QQ100 of FIG. 16 enables connectivity between the UEs, network nodes, and hosts. In that sense, the communication network may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112c and/or QQ112d) and network nodes (e.g., network node QQ110b). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110b. The hub QQ114 may also allow for a different communication scheme and/or schedule between the hub QQ114 and UEs (e.g., UE QQ112c and/or QQ112d), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110b. In other embodiments, the hub QQ114 may be a non-dedicated hub—that is, a device which is capable of operating to route communications between the UEs and network node QQ110b, but which is additionally capable of operating as a communication start and/or end point for certain data channels.

Figure 17:
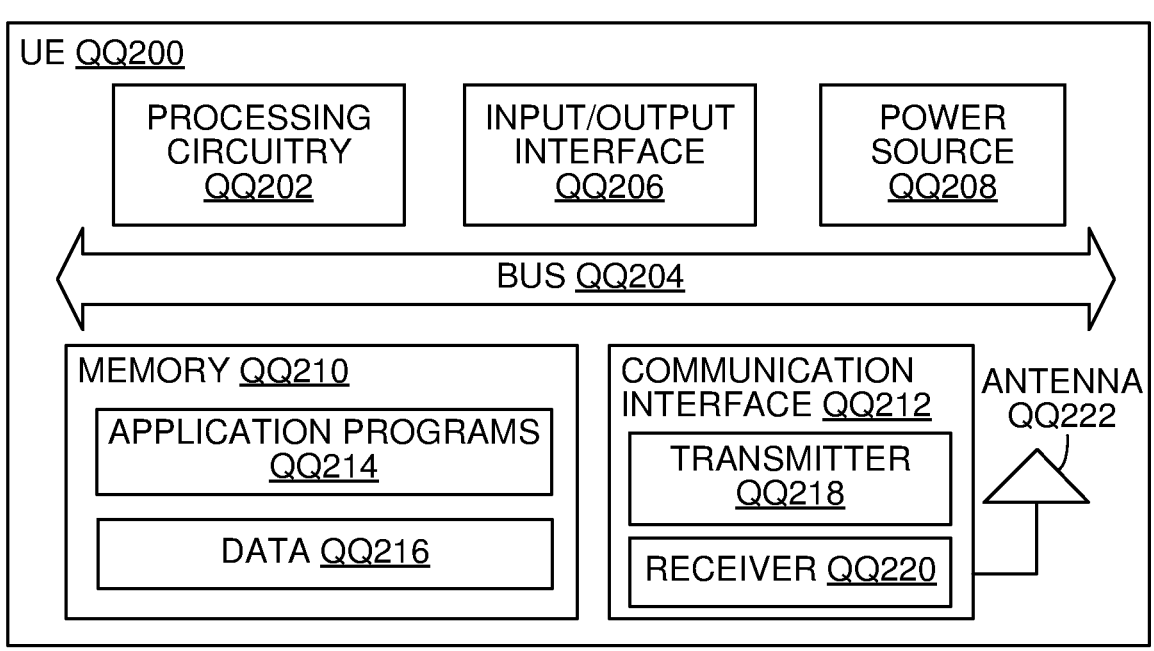
FIG. 17 is a block diagram of a user equipment in accordance with some embodiments of the present disclosure.

FIG. 17 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 17. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, a signature extraction application, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 17.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 18:
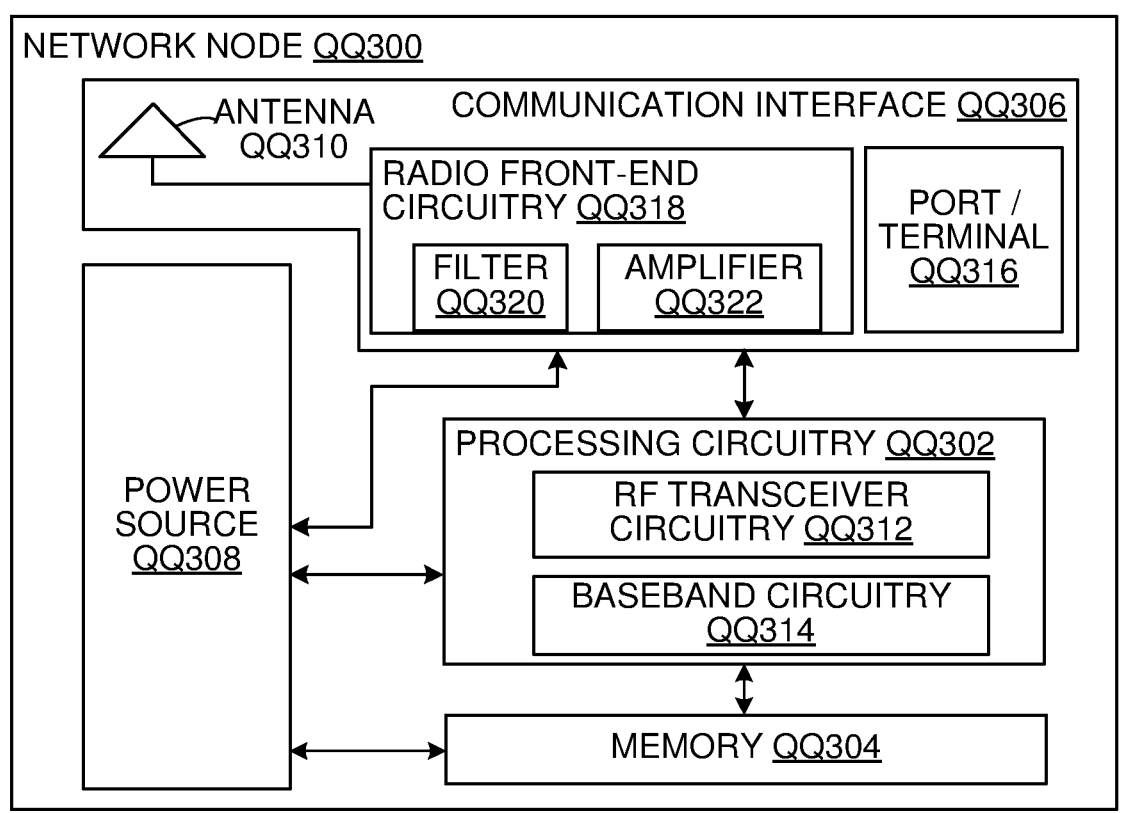
FIG. 18 is a block diagram of a network node in accordance with some embodiments of the present disclosure.

FIG. 18 shows a network node QQ300 in accordance with some embodiments. As used herein, network node refers to equipment capable, configured, arranged and/or operable to communicate directly or indirectly with a UE and/or with other network nodes or equipment, in a communication network. Examples of network nodes include, but are not limited to, servers, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), Minimization of Drive Tests (MDTs), and/or cloud-implemented servers or edge-implemented servers.

The network node QQ300 includes a processing circuitry QQ302, a memory QQ304, a communication interface QQ306, and a power source QQ308. The network node QQ300 may be composed of multiple physically separate components (e.g., a clustering component, a database (e.g., knowledge graph) component, a NodeB component and a RNC component, or a BTS component and a BSC component, etc.), which may each have their own respective components. In certain scenarios in which the network node QQ300 comprises multiple separate components (e.g., clustering and database components), one or more of the separate components may be shared among several network nodes. For example, a single network node may control multiple network nodes comprising clustering components and/or databases (e.g., repositories). In such a scenario, each unique network node and component pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same database or a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/ or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal (s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 18 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 19:
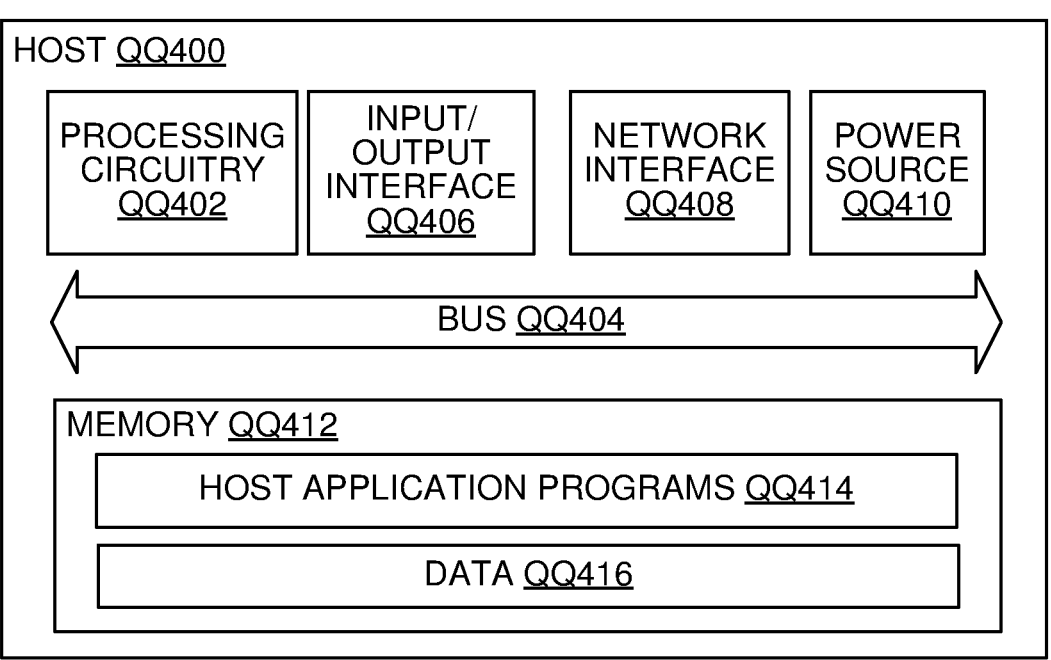
FIG. 19 is a block diagram of a host computer communicating with a user equipment in accordance with some embodiments of the present disclosure.

FIG. 19 is a block diagram of a host QQ400, which may be an embodiment of the host QQ116 of FIG. 16, in accordance with various aspects described herein. As used herein, the host QQ400 may be or comprise various combinations hardware and/or software, including a standalone server, a blade server, a cloud-implemented server, an edge-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 17 and 18, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 20:
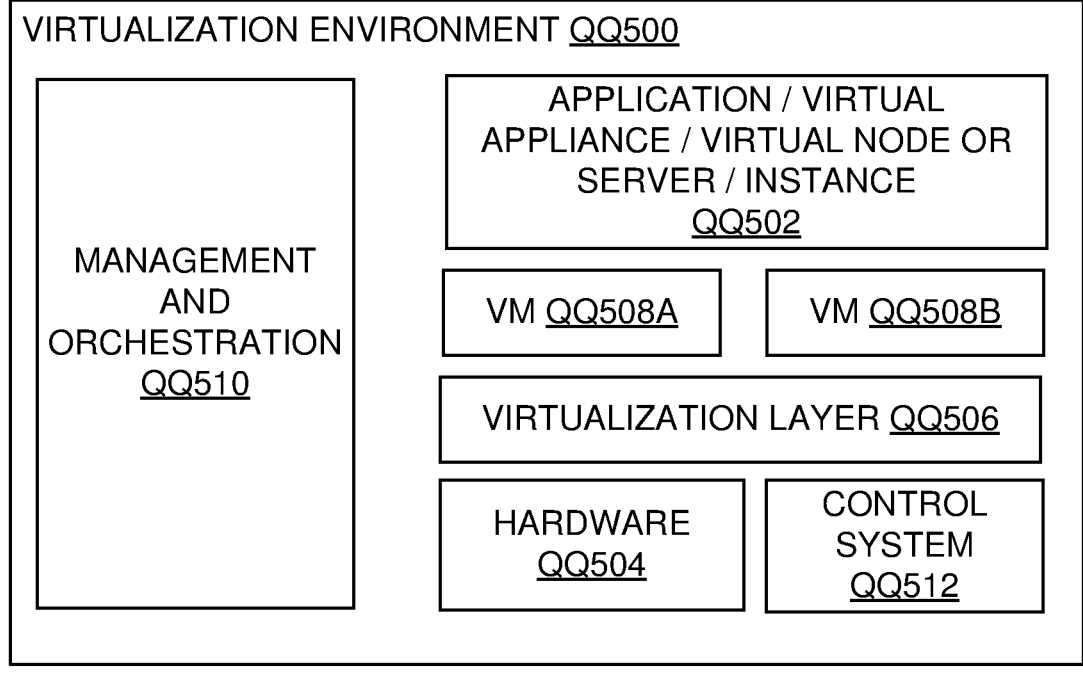
FIG. 20 is a block diagram of a virtualization environment in accordance with some embodiments of the present disclosure.

FIG. 20 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508a and QQ508b (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g. such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 21:
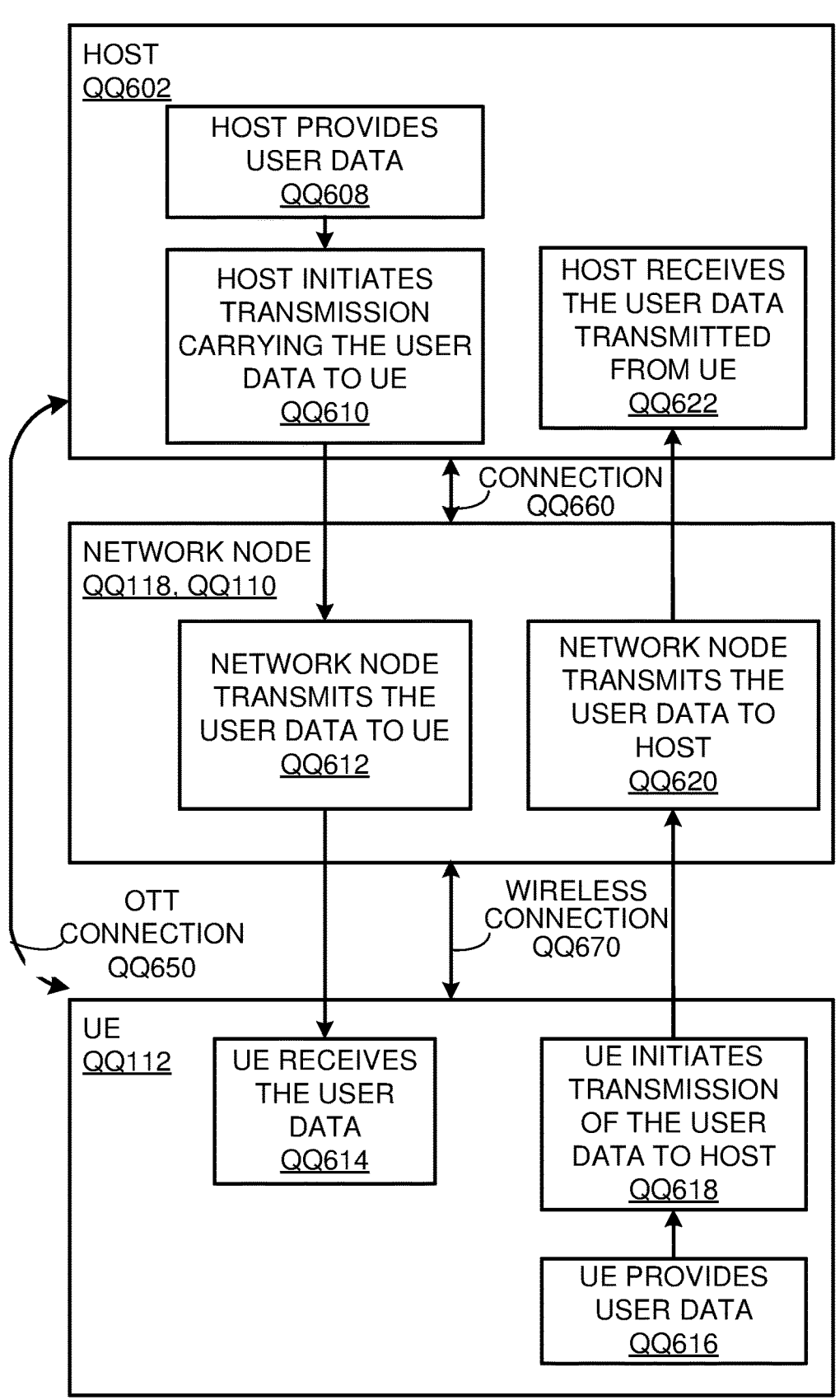
FIG. 21 is a block diagram of a host computer communicating via a base station with a user equipment over a partially wireless connection in accordance with some embodiments in accordance with some embodiments of the present disclosure.

FIG. 21 shows a communication diagram of a host QQ602 communicating via a network node QQ604 with a UE QQ606 over a partially wireless connection in accordance with some embodiments. Example implementations, in accordance with various embodiments, of the UE (such as a UE QQ112a of FIG. 16 and/or UE QQ200 of FIG. 17), network node (such as network node QQ110a of FIG. 16 and/or network node QQ300 of FIG. 18), and host (such as host QQ116 of FIG. 16 and/or host QQ400 of FIG. 19) discussed in the preceding paragraphs will now be described with reference to FIG. 21.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 16) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602.

In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve data extraction and caching and thereby provide benefits such as improved scalability, caching, and efficient searches for a feature of a sense.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for data services (such as generating and/or storing a database including a knowledge graph/graph in accordance with some embodiments herein), energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above, or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the communication devices and network nodes described herein (e.g., UEs, network nodes, servers, hosts) may include the illustrated combination of hardware components, other embodiments may comprise computing devices with different combinations of components. It is to be understood that these communication devices and network nodes may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, communication devices and network nodes may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the communication devices and/or network nodes as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/ operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method performed by a network node in a communication network for responding to a query of a first communication device to a second communication device related to a feature of a sense, the method comprising:

receiving, from the second communication device, a plurality of signatures generated from data comprising measurements of senses from at least one sensor, each signature from the plurality of signatures comprising a plurality of features of the senses extracted from the measurements and mapped to each signature;

clustering a signature from the plurality of signatures into a cluster having a classification;

searching a database that includes a plurality of clusters, including the cluster having the classification, to extract a response to the query, the extraction based on a correlation of the feature of a sense from the query to a defined label for each feature of the plurality of features from the plurality of clusters in the database, wherein the database maps each feature from the plurality of features to a defined label from a plurality of defined labels of senses for the plurality of clusters; and signalling the response to the query of the first communication device.

2. The method of claim 1, wherein the measurements of senses from at least one sensor include measurement data for at least one of a sense of touch, taste, smell, speech, and vision.

3. The method of claim 1, wherein the signature comprises one of a two-dimensional map of values of the plurality of features, a three-dimensional map of values of the plurality of features, and a vector of values of the plurality of features.

4. The method of claim 1, wherein the clustering classifies the signature based on a comparison of the signature with signatures in the cluster having the classification.

5. The method of claim 1, wherein the clustering further comprises personalized information of the first communication device from the query, the personalized information comprising at least one of geography, age, and gender of one of the first communication device and a user of the first communication device.

6. The method of claim 5, wherein the personalized information includes relative priorities of the personalized information, and the method further comprising:

biasing the mean point of the new cluster via weights, the weights dependent on the relative priorities of the personalized information; and generating new clusters based on the biasing.

7. The method of claim 6, further comprising:

when the feedback is positive feedback, storing the matching mean point labelled as accurate.

8. The method of claim 6, further comprising:

when the feedback is negative, re-biasing the mean point of the of the new cluster via modified weights;

repeating the generating new clusters, the updating the database, the providing a response, and the determining feedback until the feedback is positive feedback.

9. The method of claim 1, wherein the clustering comprises:

partitioning the plurality of signatures into subsets of signatures;

identifying a mean point of each subset of signatures;

assigning each mean point to a cluster of the plurality of clusters;

computing a distance from each mean point to the cluster;

re-allotting the mean point to a new cluster where the distance from the mean point is a minimum distance; and finding the mean point of the new cluster.

10. The method of claim 9, further comprising:

updating the database based on identifying a matching mean point in the database to the biased mean point;

providing a response to the query based on the updated database;

determining feedback for the response, the feedback comprising positive feedback or negative feedback.

11. The method of claim 1, wherein the database comprises a graph database.

12. A network node in a communication network for responding to a query of a first communication device to a second communication device related to a feature of a sense, the network node comprising:

at least one processor;

at least one memory connected to the at least one processor and storing program code that is executed by the at least one processor to perform operations comprising:

receive, from the second communication device, a plurality of signatures generated from data comprising measurements of senses from at least one sensor, each signature from the plurality of signatures comprising a plurality of features of the senses extracted from the measurements and mapped to each signature;

cluster a signature from the plurality of signatures into a cluster having a classification;

searching a database that includes a plurality of clusters, including the cluster having the classification, to extract a response to the query, the extraction based on a correlation of the feature of a sense from the query to a defined label for each feature of the plurality of features from the plurality of clusters in the database, wherein the database maps each feature from the plurality of features to a defined label from a plurality of defined labels of senses for the plurality of clusters; and signal the response to the query of the first communication device.

13. The network node of claim 12, wherein the measurements of senses from at least one sensor include measurement data for at least one of a sense of touch, taste, smell, speech, and vision.

14. The network node of claim 12, wherein the signature comprises one of a two-dimensional map of values of the plurality of features, a three-dimensional map of values of the plurality of features, and a vector of values of the plurality of features.

15. The network node of claim 12, wherein the cluster classifies the signature based on a comparison of the signature with signatures in the cluster having the classification.

* * * * *